(12) United States Patent
Kakui

(10) Patent No.: US 8,702,434 B2
(45) Date of Patent: Apr. 22, 2014

(54) CARD-TYPE LEARNING TOOLS, LEARNING APPARATUSES, PROGRAMS FOR LEARNING APPARATUSES, AND RECORDING MEDIA THEREFOR

(75) Inventor: Yasuo Kakui, Kawasaki (JP)

(73) Assignee: Sanze Co., Ltd., Tokyo (JP)

( * ) Notice: Subject to any disclaimer, the term of this patent is extended or adjusted under 35 U.S.C. 154(b) by 1203 days.

(21) Appl. No.: 12/595,442

(22) PCT Filed: Apr. 9, 2008

(86) PCT No.: PCT/JP2008/057369
§ 371 (c)(1),
(2), (4) Date: Oct. 9, 2009

(87) PCT Pub. No.: WO2008/126931
PCT Pub. Date: Oct. 23, 2008

(65) Prior Publication Data
US 2010/0112532 A1 May 6, 2010

(30) Foreign Application Priority Data

Apr. 10, 2007 (JP) ................................ 2007-102816

(51) Int. Cl.
*G09B 7/00* (2006.01)
*A63F 9/18* (2006.01)
(52) U.S. Cl.
USPC ........................................... 434/347; 273/429
(58) Field of Classification Search
USPC .......... 273/302, 429–431, 309; 434/322, 347, 434/350
See application file for complete search history.

(56) References Cited

U.S. PATENT DOCUMENTS

| 4,606,546 | A | * | 8/1986 | Rita ............................... 273/269 |
| 5,690,336 | A | * | 11/1997 | Oliver ........................... 273/302 |
| 5,836,585 | A | * | 11/1998 | LaCivita ....................... 273/287 |
| 5,895,050 | A | * | 4/1999 | Dodd et al. ................... 273/431 |
| 6,120,032 | A | * | 9/2000 | Wissinger ..................... 273/430 |
| 6,267,376 | B1 | * | 7/2001 | Jenkins ......................... 273/258 |
| 7,144,013 | B2 | * | 12/2006 | Tanaka .......................... 273/308 |
| 7,543,819 | B2 | * | 6/2009 | Cox ............................... 273/292 |

(Continued)

FOREIGN PATENT DOCUMENTS

| JP | 6-51690 | 2/1994 |
| JP | 7-204355 | 8/1995 |

(Continued)

*Primary Examiner* — Gene Kim
*Assistant Examiner* — Alyssa Hylinski
(74) *Attorney, Agent, or Firm* — Morrison & Foerster LLP

(57) ABSTRACT

An offensive player operates input means (32) to display on a display screen (31), one or more associated problems from a plenty of problems stored in a memory (42), so that the offensive player and a defensive player both input answers. According to the results (correct or incorrect) of the inputted answers, a damage point is given to the player who has lost. When the damage point of the partner player reaches a predetermined value, a plurality of associated problems are represented. Moreover, two areas (11, 12) are displayed on the display screen (31) for the offensive player and the defensive player. A card (3) for representing the problem this time is placed in the area (11 or 12) of the player who has won. Only when the area (11) is full of cards (3) and the area (12) has a card, a plurality of associated problems may be represented. The present invention enables players to get a systematic knowledge while enjoying a match, thereby increasing the learning effect.

9 Claims, 30 Drawing Sheets

(56) References Cited

U.S. PATENT DOCUMENTS

| | | | |
|---|---|---|---|
| 7,568,703 B1* | 8/2009 | Fernandes | 273/292 |
| 7,654,533 B2* | 2/2010 | Seal | 273/429 |
| 2003/0052456 A1* | 3/2003 | Lasko et al. | 273/430 |
| 2004/0017044 A1* | 1/2004 | Smith | 273/432 |
| 2008/0111306 A1* | 5/2008 | Caputo | 273/292 |
| 2009/0146376 A1* | 6/2009 | Green et al. | 273/302 |
| 2009/0218768 A1* | 9/2009 | Maalouf | 273/302 |

FOREIGN PATENT DOCUMENTS

| | | |
|---|---|---|
| JP | 8-220977 | 8/1996 |
| JP | 2000-98866 | 4/2000 |
| JP | 2000-157744 | 6/2000 |
| JP | 2002-301264 | 10/2002 |
| JP | 2005-143787 | 6/2005 |
| JP | 2006-243229 | 9/2006 |

* cited by examiner

FIG. 1
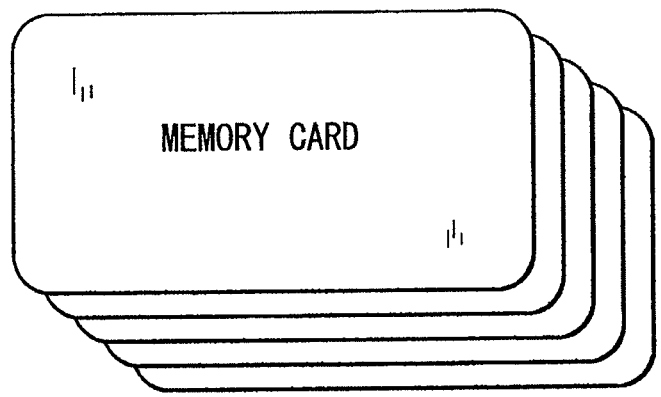
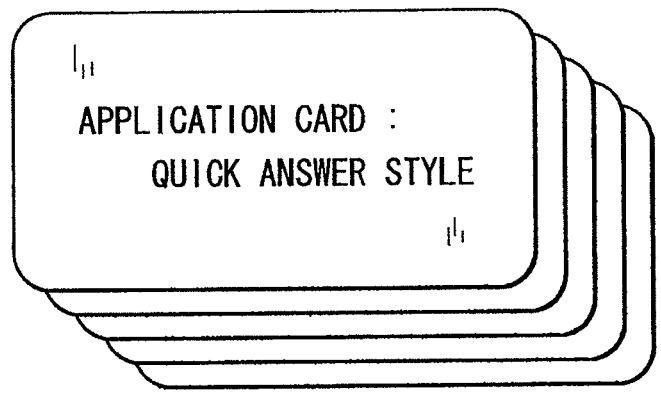
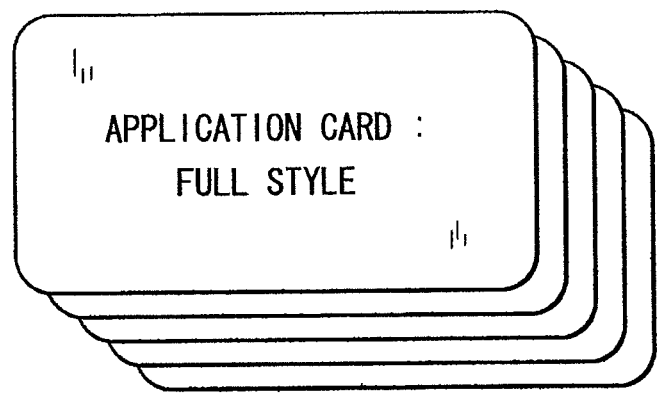

FIG. 4

(SURFACE)

APPLICATION CARD:   CARD NO.        ○○
QUICK ANSWER STYLE  DEGREE OF       △△
                    DIFFICULTY
    QUESTION        DEGREE OF       ××
                    IMPORTANCE
                    POINT           □□
REFERENCE NO. ○○,○○,○○,○○,○○,

FIG. 5

(BACK)

APPLICATION CARD:
QUICK ANSWER STYLE

ANSWER: "O" OR "X" AND
GROUNDS FOR "O" OR "X"

FIG. 6

(SURFACE)

APPLICATION CARD: CARD NO. ○○
FULL STYLE
DEGREE OF △△
DIFFICULTY
QUESTION DEGREE OF ××
IMPORTANCE
POINT □□
REFERENCE NO. ○○,○○,○○,○○,○○,

FIG. 7

(BACK)

APPLICATION CARD:
FULL STYLE

ANSWER CONTAINS DETAILED
GROUNDS ROR ANSWER

FIG. 32

| CARD LIST (JAPANESE HISTORY) | | | | | |
|---|---|---|---|---|---|
| (TITLE OF CARD) | MEMORY CARD | CARD NO.○○ | DEGREE OF DIFFICULTY○○ | DEGREE OF IMPORTANCE○○ | HP○○ QUESTION ANSWER |
| (TITLE OF CARD) | MEMORY CARD | CARD NO.○○ | DEGREE OF DIFFICULTY○○ | DEGREE OF IMPORTANCE○○ | HP○○ QUESTION ANSWER |
| (TITLE OF CARD) | MEMORY CARD | CARD NO.○○ | DEGREE OF DIFFICULTY○○ | DEGREE OF IMPORTANCE○○ | HP○○ QUESTION ANSWER |
| (TITLE OF CARD) | MEMORY CARD | CARD NO.○○ | DEGREE OF DIFFICULTY○○ | DEGREE OF IMPORTANCE○○ | HP○○ QUESTION ANSWER |
| (TITLE OF CARD) | MEMORY CARD | CARD NO.○○ | DEGREE OF DIFFICULTY○○ | DEGREE OF IMPORTANCE○○ | HP○○ QUESTION ANSWER |
| (TITLE OF CARD) | MEMORY CARD | CARD NO.○○ | DEGREE OF DIFFICULTY○○ | DEGREE OF IMPORTANCE○○ | HP○○ QUESTION ANSWER |
| (TITLE OF CARD) | APPLICATION CARD | CARD NO.○○ | DEGREE OF DIFFICULTY○○ | DEGREE OF IMPORTANCE○○ | HP○○ QUESTION ANSWER |
| (TITLE OF CARD) | APPLICATION CARD | CARD NO.○○ | DEGREE OF DIFFICULTY○○ | DEGREE OF IMPORTANCE○○ | HP○○ QUESTION ANSWER |
| (TITLE OF CARD) | APPLICATION CARD | CARD NO.○○ | DEGREE OF DIFFICULTY○○ | DEGREE OF IMPORTANCE○○ | HP○○ QUESTION ANSWER |
| (TITLE OF CARD) | APPLICATION CARD | CARD NO.○○ | DEGREE OF DIFFICULTY○○ | DEGREE OF IMPORTANCE○○ | HP○○ QUESTION ANSWER |
| (TITLE OF CARD) | APPLICATION CARD | CARD NO.○○ | DEGREE OF DIFFICULTY○○ | DEGREE OF IMPORTANCE○○ | HP○○ QUESTION ANSWER |

FIG. 35

CARD NO.
<ANSWER>
PROPER NOWN①···· PROPER NOWN②····
··············· PROPER NOWN③·······
PROPER NOWN④···· PROPER NOWN
⑤······

COMBO NO.

FIG. 36

CARD NO.
<ANSWER>
PROPER NOWN①···· PROPER NOWN②····
··············· PROPER NOWN③·······
PROPER NOWN④··            ⑤··

COMBO NO.     PROPER NOWN
              CLASSIFICATION

CARD-TYPE LEARNING TOOLS, LEARNING APPARATUSES, PROGRAMS FOR LEARNING APPARATUSES, AND RECORDING MEDIA THEREFOR

TECHNICAL FIELD

This invention relates to a card-type learning tool, a learning apparatus, a program for learning apparatus, and a recording medium therefor.

BACKGROUND TECHNOLOGY

A very long period of time has been spent for learning for examinations for schools, acquisitions of national qualifications, etc. In learning, it is needed to learn many knowledge including basic matters, etc. by heart, and a variety of application issues can be solved by the knowledge learned by heart. It is desired to perform learning accurately and efficiently until it becomes part of knowledge; however, it may be apt to repeat simple work so that interest may be lost easily.

Recently, a large number of game machines utilizing cards or computers have been proposed for example, Patent Literature #1 to #4, inclusive, propose computer-aided card games in order to enjoy games as amusement tools. Further, match-play games utilizing telecommunication system have also been proposed.

Patent Literature #1: Japanese Patent Publication No. 1995-204,355
Patent Literature #2: Japanese Patent Publication No. 2000-157,744
Patent Literature #3: Japanese Patent Publication No. 2002-301,264
Patent Literature #4: Japanese Patent Publication No. 2005-143,787

If learning could be performed enjoyably as if playing card games or computer games, it can also be done enthusiastically without getting weary of it while forgetting a lapse of time. This is very effective in performing the learning. Usual card games and computer games, however, are made mainly for play so that they are inappropriate for utilizing them for learning. Above all, upon learning, it is important to memorize one matter as well as matters associated therewith in a systematical way. In particular, an application question is difficult to solve unless knowledge would be memorized systematically. Therefore, it is of great importance to effectively obtain knowledge systematically.

This invention has been performed with the above situation taken into considerations and the object of this invention is to provide a card-type learning tool, a learning apparatus, a program for use with the learning apparatus, and a recording medium therefor adapted so as to obtain knowledge systematically while enjoying and to learn very effectively.

DISCLOSURE OF INVENTION

In order to achieve the above object, the card-type learning tool according to this invention adopts the following solutions, wherein the card-type learning tool comprises a combination of a large number of cards with a game mat on which to put the cards, which comprises:

each card describing a question on its surface and an answer thereto on its back;
each card describing a question different from another card;
each card describing its own card number distinguishing from other cards and a reference card number or numbers referenced by the question or answer thereto on the surface thereof; and
the game mat comprising plural first areas and plural second areas in which the first determined number of plural cards is put on each of the plural first areas without overlapping the cards with one another and the second predetermined number of plural cards is put on each of the second areas adjacent to each of the first areas without overlapping the cards with one another;
wherein learning is performed by playing a card game in a match by learners who share the cards alternately as an offense and a defense in such a manner that, when the offense presents the surface of one card so as for the defense to view the question and presents a question indicated on the surface thereof asking the defense an answer thereto, the defense answers the question, followed by the offense answering the question, too, and a decision of victory and defeat of the game is made on the basis of the answer indicated on the back of the one card, and, when the offense is decided as a winner of the match on the basis of the decision, the one card is put on the first area of the offense, on the one hand, or on the second area of the offense, on the other, if the first area of the offense is filled with the predetermined number of cards, and in such a manner that the offense is permitted to present only one question by displaying another one card with the surface of the card up when no card is put on the second area of the offense while the offense is permitted to present plural reference questions once by displaying plural reference cards referenced by a reference card number or numbers only when a card is put on the second area of the offense.

The above solution is to allow persons who desire to study together to select a question from a large number of cards and present it to the other as if playing a match game. More specifically, this game is played by repeating the process in which the offense presents a question described on a card and the defense answers alternately. This game can assist in learning many questions and answers and making them part of knowledge in a natural way. In addition, as this card-type learning tool can be used for learning enjoyably as if enjoying a card game as play, the situation that the players become weary of or tired of the card game may be prevented or decreased, thereby capable of ensuring an elongated time for study and achieving great learning results. Moreover, as this tool can be played singly, one person can be encouraged to learn answers and questions thereto by heart in order to defeat competitors and obtain good learning results. Further, as all match players can visually make quick access to the answer simply by turning the card over which indicates the question on its surface and the answer on its back, it is preferred to learn many questions within short time in a concentrated manner. In addition, as each card carries reference card number or numbers indicating a card or cards having a reference question or questions referenced by the question or the answer indicated on the each card, many questions relating to one question can be learned continuously by referencing the reference card numbers as a key. Therefore this is very useful to learn knowledge systematically. Moreover, this tool can assist in playing a match of a very high level by presenting all plural reference questions linked by the reference card numbers at a time and letting the competitor to answer all the reference questions. Therefore, this game can be enjoyed even by persons having a high learning level and a systematic knowledge can also be obtained very effectively.

As the cards are put on the first area or the second area in accordance with victory or defeat of the game, the current state of victory and defeat can be recognized at a glance. The use of the game mat is preferred in order to heighten elements of play and learn more enjoyably and effectively. In particular, this tool can assist in playing a game in a more complicated manner, for instance, by adding the card of the winner to the first area and then to the second area for each round of offense and defense when the first area has been filled with the cards and presenting plural reference questions only when a card is present on the second area. Therefore, this tool is effective for heightening learning results more.

Additionally, after the game was over, only the answerer who has answered the question incorrectly can review the question utilizing the card put on the competitor's area. This can also help in heightening learning results.

Given the above solution, the preferred embodiments of the card-type learning tool relate each to the card-type learning tool comprising:

the cards composed of memory cards, application cards for quick answer style and application cards for full style at least one of which is used for playing the game;

the memory cards each describing matters which are to be learned about questions as an answer by heart;

the application cards for quick answer style each describing, as an answer, the alternative of a right answer or a wrong answer to the question and the grounds for the answer thereto; and the application cards for full style each describing, as an answer, details of the grounds for the answer. For the learning tool of this invention, the memory cards are mainly for use in learning by heart and they are preferred to learn basic matters. The application cards for quick answer style contain application questions utilizing basic knowledge and the application questions are to be answered by the alternative of right or wrong answers so that they are preferably used for answering the application questions and learning them within a short period of time. Further, the grounds for the alternative answers can be known quickly. Moreover, the application cards for full style are preferred to learn knowledge deeply because the detailed grounds for the answers are required.

Each of the cards display a degree of difficulty, a degree of importance and a point as a score of victory or defeat of a match in such a manner that the point to be displayed varies with at least one of the degree of difficulty and the degree of importance. This learning tool is preferred to learn more enjoyably by playing the match utilizing the point.

The card-type learning tool according to the preferred embodiment is disposed in such a manner that the game mat is provided with the first area, the second area and a third area in a region different from each other; the third area is provided as only one area having a space wide enough to allow plural cards to be put in a row thereon without overlapping with each other; the second area is disposed plural and each is adjacent to the third area in a circumferential direction thereof; and the first area is disposed plural and each is adjacent to each second area; wherein a question is presented by putting one card or cards on the third area with the surface thereof up. This learning tool ensures a place as a common place for plural match players, on which to put the cards for presenting the questions and the answers thereto, and allows each player to make quick access to the current status of victory and defeat of the match for each player by using the first area and the second area. As a pair of the first area and the second area to be used by each of the match players are provided around the third area, the players can play the match facing each other so that an atmosphere of the match can be improved.

In order to achieve the above objects, the learning apparatus according to this invention is arranged so as to play a match game alternately between persons operating input means as the offense which presents the question on the display screen and the defense to which the question is presented in such a manner that the offense inputs a question to permit the defense to view the question and the defense inputs an answer thereto, followed by the offense inputting an answer thereto, too, and, when either one of the answers is right and the other answer is wrong, a winner of the match who gave the right answer is presented with a positive point or a loser of the match who gave the wrong answer is presented with a negative point; wherein the learning apparatus comprises:

a memory means for memorizing a large number of questions and answers thereto and points as well as reference questions which are other questions referenced by each question or an answer thereto and mapped thereto as a database;

an area displaying means for displaying on the display screen for each of the offense and the defense the first area capable of displaying plural cards in a row without overlapping with one another and the second area adjacent to the first area, capable of displaying plural cards in a row without overlapping with one another;

a first question presenting means for presenting one question with the surface of one card up on the display screen by selecting it from a large number of questions of the database by the input means;

a second question presenting means for presenting plural reference questions reference by each other and selected from a large number of questions of the database by the input means with the surface of each card up on the display screen;

a first right-wrong answer presenting means for selecting the answer to the one question by checking it with the database when the answer to the one question displayed on the display screen is inputted by the input means and for displaying the answer thereto with the back of the card up on the display screen by turning the card over;

a second right-wrong answer presenting means for selecting the answers to the plural reference questions by checking them with the database when respective answers to the plural reference questions displayed on the display screen are inputted by the input means and for displaying the answers thereto with the back of each reference card up on the display screen by turning each card over, respectively;

a point presenting means for selecting a point set for the question presented in the match by checking the point with the database on the basis of a decision of the right or wrong answer presented by each of the right-wrong answer presenting means and for presenting the point selected and, when the plural reference questions are presented by the second question presenting means, for presenting the points selected for each of the reference questions in accordance with the decision of the right or wrong answers thereto, respectively; and a card processing means for displaying the card used for presenting the question by the first question presenting means on the first area of the offense decided as a winner for the match and for displaying the card used therefor on the second area of the offense when the first area is filled with the predetermined number of cards; wherein:

the second question presenting means is set to operate on the condition that a card is present on the second area of the offense in such a manner that plural reference questions can be presented in the larger number as the number of cards displayed on the second area of the offense increases.

The above solution permits players who desire to learn together to play a match as competitors and present questions selected from a large number of questions to each other. More specifically, a match is played by steps of procedure such that a person playing the match as an offense presents a question and a person playing the match as a defense gives an answer to the question presented. By repeating this procedure by changing the offense and the defense alternately, many questions and answers thereto are presented and learned in their memory as knowledge strongly and naturally. Further, as this learning apparatus can assist in learning with a feeling as if playing a game as play, the situation of becoming weary of or tired of learning can be prevented or decreased, thereby ensuring naturally an elongated time of learning and achieving great learning results. When this game is played by one person, he/she can be encouraged to learn answers to questions by heart in order to win the game against competitors and can obtain good learning results. As a matter of course, since this game can be made quick access to the answer by presenting the answer by the right-wrong answer presenting means, it is preferred to learn many questions within a short period of time in a concentrated way. In addition, as each question is mapped to reference questions having reference to the each question or the answer thereto, it is possible to learn many questions continuously and this is very preferred in learning knowledge systematically. Moreover, as this learning apparatus permits a game of a very high level by presenting plural reference questions once and requiring answers to all the questions, even persons having a very high learning level can also enjoy the game and obtain a systematic knowledge very effectively. Further, as the plural reference questions can be presented once to the competitor only when the points become a predetermined point value or higher, the pleasure of playing the game can be improved more and it is very preferred to further improve the desire of learning. Additionally, as the very large number of questions and answers thereto as well as reference questions can be stored collectively in the memory means, this is preferred to ensure a sufficient amount of questions and learn over a wide variety of learning fields.

In particular, the game may be enjoyed more by making it complicated by the positioning of the cards in each area and the linking of the points so that the desire to learn can be improved more by that. Further, the game can be made more enjoyable and more thrilling by increasing cards to be displayed on the second area in the larger number to increase reference questions to be presented. This may assist in improving the desire to learn more and very desirable for acquiring a systematic knowledge sufficiently.

Given the above solutions, the preferred embodiments of the learning apparatus may further comprise a question-presenting selection means for selecting the process of presenting the plural questions by the second question presenting means in the state that the card is displayed on the second area. This embodiment permits a selection of one question or plural questions to be presented so that it may preferably assist in improving a game feeling, i.e., the desire to learn.

When the plural reference questions are presented by the second question presenting means, the number of the cards displayed on the display screen of the offense can be decreased on the occasion where the answer of the defense is right and the answer of the offense is wrong. This embodiment may give a chance to acquire points once by using the plural questions, but an offense by presenting the plural questions is prohibited when the offense is failed to answer correctly so that this offense is at high risk for acquiring the points, but at high return. Therefore, this game may become more enjoyable and the desire to learn can be improved more.

As a total value of the points presented by the point presenting means reaches a predetermined point value or higher, a decision of victory and defeat of the game may be made finally and the point presenting means is set for the winner of the match to select the process of presenting the point by increasing the own points or decreasing the points of the loser of the match on the basis of the results of the decision of the match. This embodiment makes the process of acquisition of the points more complicated and it is preferred in learning more enjoyably.

The memory means stores each question by mapping it to at least one of the degree of difficulty and the degree of importance for each question, and the point value to be presented by the point presenting means is set so as to vary with at least one of the degree of difficulty and the degree of importance. This embodiment may help the learners to recognize the degree of difficulty or the degree of importance of the question strongly by using the points. This embodiment is also preferred to perform learning more enjoyably.

The plural user's terminals equipped each with the display screen and the input means and the server are mutually connected to each other through network and a server is loaded with the memory means and the right-wrong answer presenting means in order for the operators of the different user's terminals to play a match as competitors. This embodiment allows the match players at remote places to play the match game. Further, the server stores a large number of questions and answers thereto so that it can save a burden imposed on the user's terminals. Moreover, the server may play a role of acting just like a referee as a neutral position for the match.

The learning apparatus of this invention further comprises a referencing means for storing the reference question that is another question reference to each questions or the answer thereto and mapped thereto for each question as the database in the memory means; wherein the referencing means comprises:

a term registering means for registering an important term contained in the question and the answer thereto for each question;

a search means for searching for other question containing the important term registered by the term registering means as a question or the answer thereto; and a memorizing means for memorizing the questions searched for by the search means as reference questions in the memory means. This embodiment allows the reference questions to be readily mapped to each of a large number of questions.

In order to achieve the above objects, the program for use with the learning apparatus according to this invention is arranged to execute a computer by playing a match game between operators of each input means alternately as an offense who presents a question and a defense to whom the question is presented in such a manner that the defense answers a question presented by the offense and then the offense answers the same question and that, when either one of the offense and the defense gives a right answer and the other gives a wrong answer, a positive point is presented to a winner of the match who gave the right answer or a negative point is presented to a loser of the match who gave the wrong answer; and wherein the program comprises:

an area displaying step for displaying, for each of the offense and the defense, a first area capable of displaying plural cards on the display screen without overlapping with one another and a second area adjacent to the first area for displaying plural cards on the display screen without overlapping with one another;

a first question presenting step for displaying one question with the surface of one card up on the display screen by selecting the one question by the input means from the memory of the memory means containing a large number of questions and answers thereto and points as well as reference questions which are other questions reference by each other and mapped thereto for as the database for each question;

a second question presenting step for displaying plural reference questions referenced by each other with the surface of each card up on the display screen by selecting the plural reference questions from the memory of the memory means by the input means, respectively;

a first right-wrong answer presenting step for selecting the answer to the question displayed on the display screen by checking it with the database when the answer to the question has been inputted by the input means and for displaying one card with the back of the card indicating the selected answer up on the display screen by turning the card over;

a second right-wrong answer presenting step for selecting the answers to each of the plural reference questions by checking the answer by the database when the answers to the plural reference questions displayed on the display screen have been inputted by the input means, respectively, and for displaying the plural cards with the back of each card indicating the selected answer up on the display screen by turning each of the plural reference cards over;

a point presenting step for selecting a point set for the question presented in the match by checking the point with the database on a decision of victory and defeat of the match made on the basis of the results of the right or wrong answer decided in each of the right-wrong answer presenting step and for presenting the selected point and, in the case of the plural reference questions presented by the second question presenting means, for presenting the points decided on the basis of the points selected for each question constituting the plural reference questions; and a card processing step for displaying the card indicating the question presented in the first question presenting step on the first area of the offense as the winner of the match decided on the basis of the results of the right or wrong answer in the first right-wrong answer presenting step and on the second area of the offense when the first area of the offense is filled with the predetermined number of cards;

wherein the second question presenting step is set so as to operate on the condition that a card is displayed on the second area of the offense and increase the number of reference questions to be presented as the number of cards displayed on the second area of the offense increases.

Given the above solution, the more preferred embodiment relates to the program for the learning apparatus, further comprising a question-presenting selection means for selecting an option to execute the second question presenting step in the state in which the card is displayed on the second area.

In order to achieve the above objects, the recording medium according to this invention is readable by a computer and memorizes the program for the learning apparatus.

In order to achieve the objects, the learning apparatus according to this invention may comprises:

a display screen;

a manually operable input means;

a memory means memorizing a large number of questions and answers thereto and points as well as reference questions which are other questions referenced by each question or the answer thereto and mapped thereto for each question as a database;

a first question presenting means for displaying one question on the display screen, which is selected from a large number of questions of the database by the input means;

a second question presenting means for displaying plural reference questions having reference to each other on the display screen, which are selected from a large number of questions of the database by the input means;

a first right-wrong answer presenting means for displaying the result of judgment on the display screen when the answer has been inputted against the one question displayed on the display screen by the input means, which is obtained by selecting the right answer to the one question by checking the inputted answer with the database and judging the inputted answer whether it is right or wrong on the basis of the right answer selected;

a second right-wrong answer presenting means for displaying the result of judgment on the display screen, when plural answers were inputted against the plural reference questions by the input means, which is obtained by selecting the answer to each of the plural reference questions by checking it with the database and judging whether all the inputted answers are right or wrong on the basis of the right answers selected; and a point presenting means for selecting the point corresponding to the presented question by checking it with the database in accordance with the results of the right or wrong answer presented by each of the right-wrong answer presenting means and for presenting the point on the basis of the point selected;

wherein the second question presenting means is set to operate on the condition that the point to be presented in accordance with the right or wrong answer to the question presented by the first question presenting means is equal to or higher than a predetermined point value.

The above solutions can present many questions and answers thereto, resulting to becoming in one's memory as knowledge naturally and extensively. As this learning apparatus can assist in learning enjoyably as if enjoying a game as play, the situation of becoming weary of and tired of learning may be prevented or decreased leading to ensuring an elongated period of time for learning and achieving great learning results. As this learning apparatus can be played alone, the player may be encouraged to learn the answers to questions by heart and heighten the learning results. It is needless to say that the answer can be learned soon after it has been presented by the right-or-wrong answer presenting means so that this is preferred in learning many questions in a concentrated manner for a short period of time. Further, as the question and the answer thereto are mapped to the reference question, it is also possible to learn many matters associated with one question continuously and this embodiment is very preferred to learn knowledge systematically. Moreover, as this embodiment permits playing a game of a very high level by presenting the plural reference questions once and requiring the answers to all the reference questions, the learner of a high learning level can also enjoy the game and obtain a systematic knowledge very effectively. In addition, as this game permits the plural reference questions to be presented once only after the points reach a predetermined point value, it can be enjoyed more as a game and it is also very preferred to heighten the desire to learning more. Furthermore, as the memory means can memorize a very large number of questions and answers thereto as well as reference questions associated therewith in a concentrated way, it is preferred to ensure a sufficient amount of questions and further to learn over a wide range of learning fields.

Given the above solution, the preferred embodiments relate to the learning apparatus wherein:

the memory means is provided with a first memory section and a second memory section;

the first memory section memorizes a large number of questions and answers thereto and points as well as reference questions; and the second memory section selectively memorizes the questions, the answers thereto and the points, together with the reference questions, for only a portion of the questions selected from the contents of the memory of the first memory section by the input means; and the questions presented by the first and second question presenting means are set to be limited only to the questions memorized in the second memory section. This embodiment permits the very large number of the questions and the answers thereto as well as the reference questions to be memorized in the first memory section so that the learner can learn using the number of the questions within an appropriate scope memorized in the second memory section.

In the embodiment, upon memorizing a portion of the contents of memory of the first memory section in the second memory section, the plural questions memorized in the first memory section are displayed in a tree chart on the display screen and the questions selected from the questions displayed are memorized in the second memory section by the input means. This embodiment is preferred for the learner to easily select and present only the question which the learner wishes to learn.

When the points exceed the predetermined point value, the number of the reference questions which can be selected become larger as the predetermined point value becomes larger. By increasing the number of the questions which can be presented once in accordance with the points, this embodiment can preferably heighten a game feeling and the desire to learn more.

As the points reach the predetermined point value or higher, an inquiry about an alternative option to present the reference questions by the second question presenting means or to present no plural questions on the display screen is inputted by the input means. Only when the option to present the plural reference questions is selected by the input means, the plural reference questions is permitted to be presented by the second question presenting means and, when the option to present no plural questions is selected, only one question is permitted to be presented by the first question presenting means. This embodiment permits a selection of the number of the questions to be presented once to one or more so that it may assist in heightening a game feeling and the desire to learn more.

This game is played in a match system by the operators of the input means alternately as an offense who presents the question and a defense to whom the question is presented, in such a manner that:

when the defense inputs an answer to the question and then the offense inputs an answer thereto, too, a positive point is presented to the winner of the match who gave the right answer or a negative point is presented to the loser of the match who gave the wrong answer, when either of the offense and the defense gave the right answer while the other gave the wrong answer; and the points are presented on the basis of a decision of the total points summing up the point set for each reference question in accordance with the right-or-wrong answers to the plural reference questions presented by the second question presenting means, respectively. This embodiment can assist in playing the game more enjoyably and heightening the desire to learn more with the pleasure to obtain the big points to be presented particularly when all the right answers are given.

The learning apparatus is set so as to have two kinds of points, i.e., a first point value and a second point value, as a point value indicating the points and permit the plural reference questions to be presented by the second question presenting means when the first point value reaches a predetermined full value or higher in such a manner that the point is presented by adding the first point value when the first point value is lower than the predetermined full value, on the one hand, and the points are added as the second point value when the first point value reaches the predetermined full value, on the other, wherein, when the plural reference questions are presented by the second question presenting means and the defense gives a right answer while the offense gives a wrong answer, the point presenting means is set to decrease the first point value of the offense. As this embodiment may give the offense a big chance to obtain large points when the offense presents the plural reference questions, while losing the chance if the offense have given wrong answers, a thrilling feeling of playing the game can be enjoyed with the desire to learn more by that.

For the learning apparatus according to this invention, one question is presented by the first question presenting means by displaying the surface of one card indicating the one question on the display screen and an answer thereto is presented by the first right-or-wrong answer presenting means by turning the one card over to display the back of the one card indicating the answer thereto on the display screen, while the plural reference questions are presented by the second question presenting means by displaying the surface of each of plural cards indicating each one question in a row on the display screen and the plural answers thereto are presented by the second right-or-wrong answer presenting means by turning the cards over to display the back of each card indicating an answer thereto on the display screen. This embodiment enables learning enjoyable as in a feeling of playing a card game.

The program for use with the learning apparatus according to this invention relates to the program for use with the learning apparatus for executing a computer, which comprises:

a first question presenting step for selecting one question by an input means from a memory means storing in its memory a large number of questions and answers thereto and points as well as reference questions referenced by the one question or the answer thereto and mapped thereto as a database and for displaying the one question selected on a display screen;

a second question presenting step for selecting plural reference questions referenced by each other from the database by the input means and displaying the plural reference questions selected on the display screen;

a first right-wrong answer presenting step for selecting the answer to the one question by checking the answer thereto with the database when the answer to the one question is inputted by the input means, and performing judgment whether the answer to the one question is right or wrong on the basis of the selected answer and for displaying the result of judgment on the display screen;

a second right-wrong answer presenting step for selecting the answers to the plural reference questions by checking the answers thereto with the database when the answers to the plural reference questions are inputted by the input means, respectively, and performing judgment whether each answer thereto is right or wrong for all the plural reference questions on the basis of the selected answer and for displaying the result of judgment on the display screen; and a point presenting step for selecting a point corresponding to the presented question by checking the point with the database in accordance with the result of judgment by either of the right-wrong answer presenting steps and for displaying the selected point on the display screen;

wherein the second question presenting step is set to be executed on the condition that the point to be presented in accordance with the right or wrong answer to the question presented in the first question presenting step is equal to or above a predetermined value.

The program for the learning apparatus according to this invention relates to a recording medium readable with a computer, which stores the program for use with the learning apparatus.

This invention enables obtaining a systematic knowledge while enjoying, and assists in learning very effectively. Other advantages and effects of this invention will become more apparent in the course of a description about modes of examples as will be described hereinafter.

BRIEF DESCRIPTION OF DRAWINGS

FIG. 1 is a perspective view showing kinds of cards.

FIG. 4 is a plane view showing an example of the surface of an application card for quick answer style.

FIG. 5 is a plane view showing an example of the back of an application card for quick answer style.

FIG. 6 is a plane view showing an example of the surface of an application card for full style.

FIG. 7 is a plane view showing an example of the back of an application card for full style.

FIG. 32 is a view showing an example of the contents of memory of a large number of questions, etc. to be memorized in a memory means as a database.

FIG. 35 is a view showing a state in which neither card No. nor reference card No. are provided for one question.

FIG. 36 is a view showing a state in which a proper noun present in the question or answer is registered as an important word in the state of FIG. 35.

BEST MODES FOR CARRYING OUT THE INVENTION

In order to allow an understanding of this invention, first a description will be made hereinafter regarding a learning game utilizing physical cards.

As shown in FIG. 1, cards 3 to be used for a game may be composed of three kinds of cards comprising memory cards 3A, application cards for quick answer style 3B, and application cards for full style 3C. Each of the cards may be made of thin paper, plastics, etc., like a commercial playing card. The cards 3A, 3B and 3C may be composed of a large number (for example, 100 to several hundreds sheets) of cards for each subject.

Figure 2:
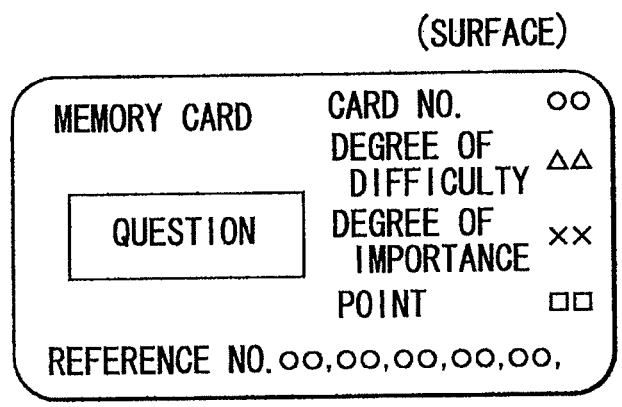
FIG. 2 is a plane view showing an example of the surface of a memory card.
Figure 3:
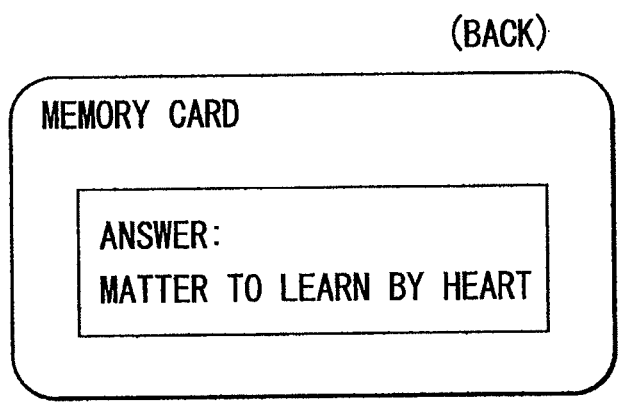
FIG. 3 is a plane view showing an example of the back of a memory card.

FIG. 2 shows an example of an item to be indicated on the surface of a memory card 3A, and FIG. 3 shows an example of an item to be indicated on the back of the memory card. More specifically, the surface of the memory card 3A represents an indication as a memory card, a question, a card No., a degree of difficulty, a degree of importance, and a reference card No. or Nos. of a card or cards associated with the card (hereinafter referred to also as "Combo No."). The back of the memory card 3A indicates an answer to the question indicated on the surface of the card. As a question indicated on the card surface requires a matter to be memorized as an answer by heart as will be described hereinafter, matters to be memorized are indicated intermittently. For instance, if a subject to be studied is civil law, an code number is indicated as a question on the surface of the card, and the contents of the code is indicted as an answer on the back of the card. It is needless to say that each card carries a different question.

The card represented by the above reference card No. is the card indicating a question or an answer associated with an important matter indicated in the question or the answer, regardless of the kind of the card. This is likewise applicable to the application cards for quick answer style 3B and to the application card for full style 3C. The degree of difficulty indicates a degree of difficulty to solve the question. It may be divided by several stages, for example, easy, ordinary and difficult, etc. or by numeral stages, for example, 1, 2, 3, . . . , or by special design stages, for example, a star-shaped symbols, and the like. This can also be applied to the application cards for quick answer style 3B and to the application card for full style 3C. The degree of importance refers to a degree of importance of a question. It may be divided by several stages, for example, high, medium and low, etc. or by numeral stages, for example, 1, 2, 3, . . . , or .by special design stages, for example, a star-shaped symbols, and the like. This can also be applied to the application cards for quick answer style 3B and to the application card for full style 3C.

FIG. 4 shows an example of an item to be indicated on the surface of an application card for quick answer style 3B, and FIG. 5 shows an example of an item to be indicated on the back of the application card for quick answer style 3B. On the surface of the application for quick answer style 3B, there is an indication of Application Card—Quick Answer Style, a question, a card No., a degree of difficulty, a degree of importance, and reference card No. or Nos. referring to another card or cards. On the back thereof, there is a description of an answer to the question indicated on the surface of the card. The answer is indicted as alternatives, for example, "O" (right) or "X" (false=wrong). Therefore, the question is indicated as a request for answering the question by "O" (right) or "X" (wrong). In many cases, the question is indicated in a sentence style. In addition, a brief ground for the answer by the "O" (right) or "X" (wrong) answer is added.

FIG. 6 shows an example of an item to be indicated on the surface of the application card for full style 3C, and FIG. 7 shows an example of an item to be indicated on the back of the application card for full style 3C. On the surface of the application card for full style 3C, there is an indication of application card for full style, a question, a card No., a degree of difficulty of the question, a degree of importance of the question, and a reference card No. or Nos. of another card or cards having reference to the question. On the back of the application card for full style 3C, there is an indication of an answer to the question indicated on the surface of the card. The answer contains an indication of detailed grounds for the answer. Therefore, the answer is set so as to require for such grounds for the answer. In many cases, the answer is indicated in a sentence style. A degree of difficulty of the answer is set to be higher relative to a question set on the memory cards 3A and the application cards for quick answer style 3B.

Figure 8:
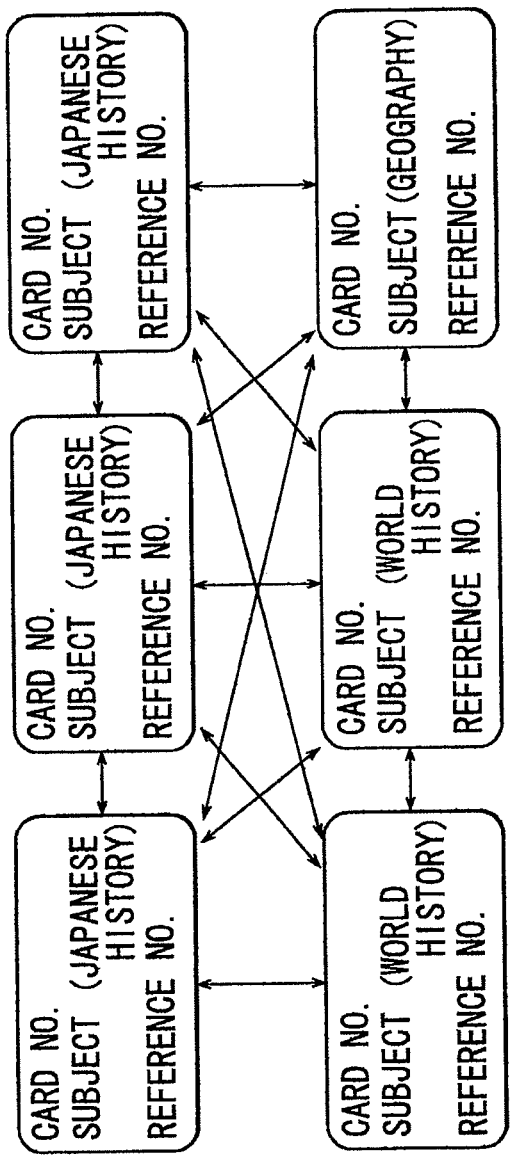
FIG. 8 is a view showing an example of plural reference questions.

FIG. 8 shows an example of study cards 3 focusing on history as a main subject, which are composed of six sheets of cards linked to one another by reference card No. Among the six cards, three cards relate to Japanese history, two of them to world history, and one card to geography. In FIG. 8, the cards 3 indicated by arrow symbols are associated with each other, and the cards indicating the matters associated with a question or an answer of a certain card 3 are indicated in the form of a tree chart across the subjects, thereby enabling a ready access to a precise relationship among the cards.

Figure 9:
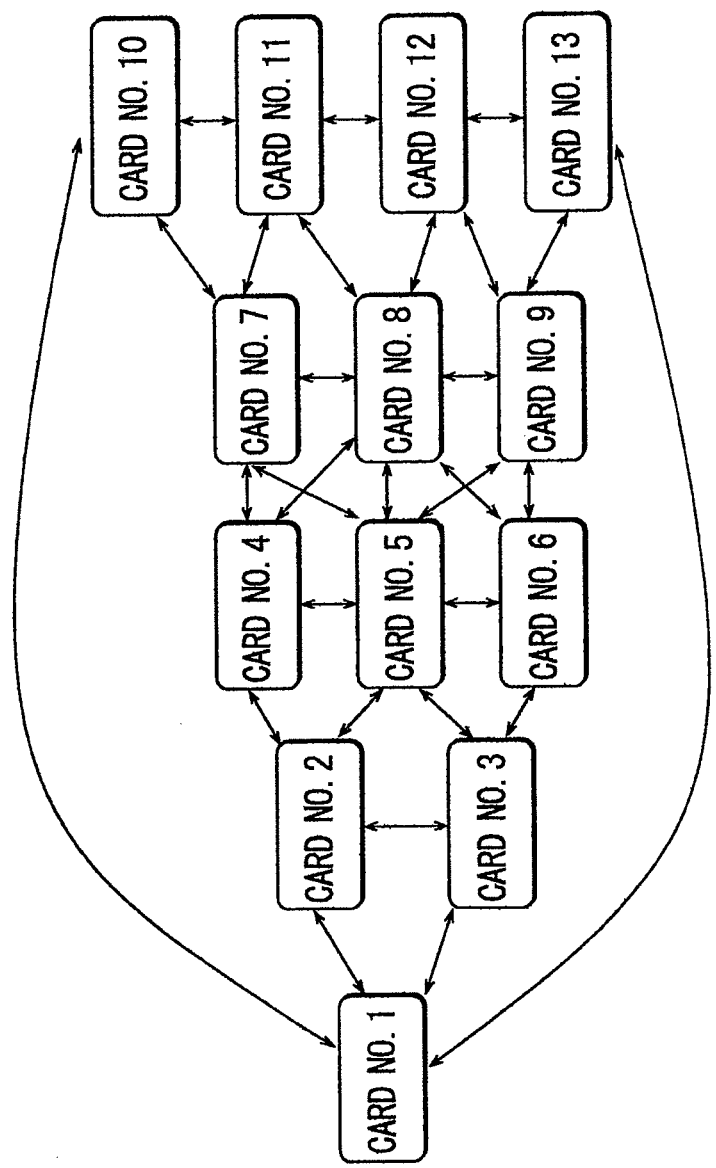
FIG. 9 is a tree chart showing plural reference questions linked to one another.
Figure 10:
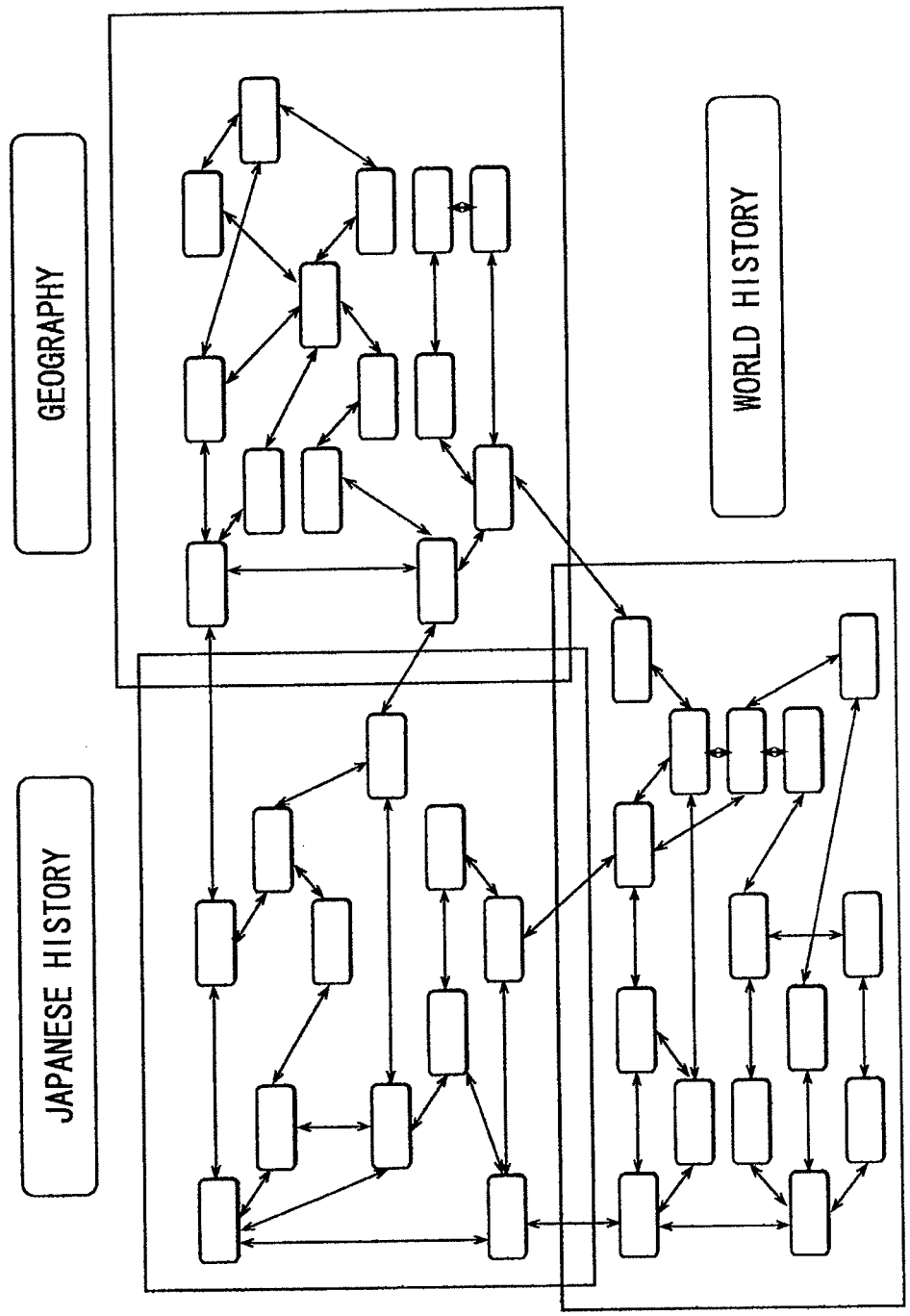
FIG. 10 is a tree chart showing plural reference questions over a range of different subjects.
Figure 11:
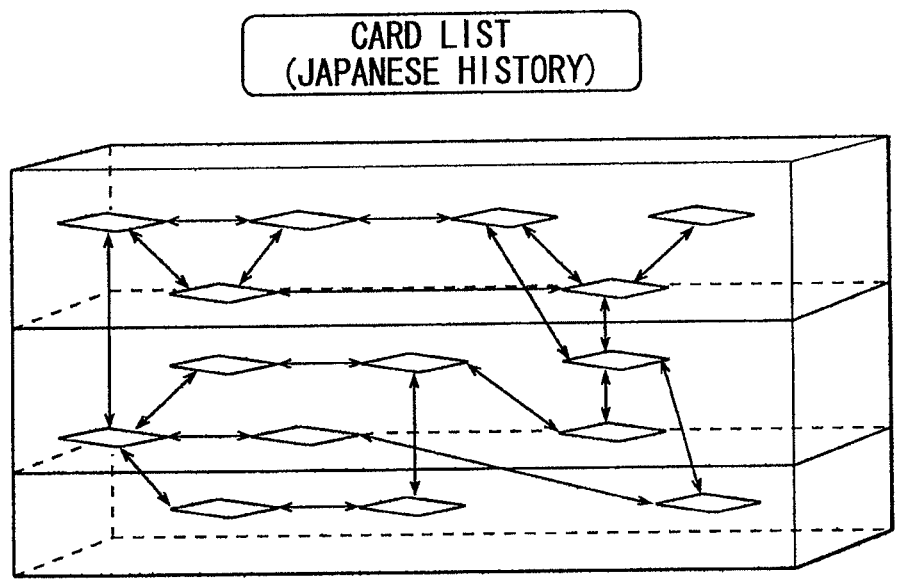
FIG. 11 is a tree chart showing plural reference questions over a range of different learning years.

FIG. 9 illustrates an example indicating a larger tree chart of cards than the case of FIG. 8 in which the cards are increased. FIG. 10 illustrates an example of a tree chart indicating links across subjects. FIG. 11 illustrates a tree chart constructed so as to indicate vertically hierarchical links in one subject in accordance with a difference among learning stages (for example, among school years, e.g., the first year, second year and third year of high school and so on). The more a game is played with a larger number of cards 3 interconnected with one another in a complicated tree chart, the higher learning results can be achieved resulting in part of more systematical knowledge. For beginners, however, it is advisable to select cards 3 constructed within a range of a relatively simple tree chart.

Figure 12:
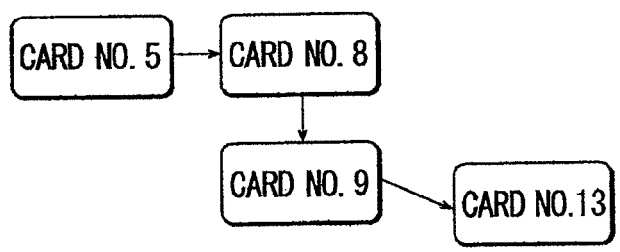
FIG. 12 is a view showing a portion of plural reference questions selected from plural reference questions displayed in a tree chart.
Figure 13:
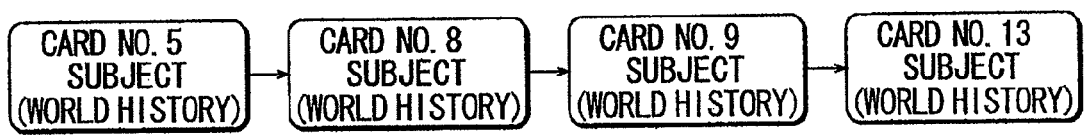
FIG. 13 is a view showing the order of cards of FIG. 12 with the cards rearranged in a right-left direction.

FIG. 12 shows an example of cards that can be selected when a game is played in a consecutive question-and-answer system (hereinafter referred to also as "COMBO" offense). For instance, the offense selects four sheets of cards 3, i.e., Nos. 5, 8, 9 and 10, from the plural cards 3 having a tree chart as illustrated in FIG. 9, and the cards 3 are represented as illustrated in the tree chart. FIG. 13 shows a state where the four cards 3 selected are arranged in a row in numerical order of the card number. The state as illustrated in FIG. 13 is a mode of arrangement of the cards when the cards 3 are presented to the defense on the occasion of the COMBO offense, and the defense is required to answer the questions in the order of card Nos. as arranged above.

Figure 14:
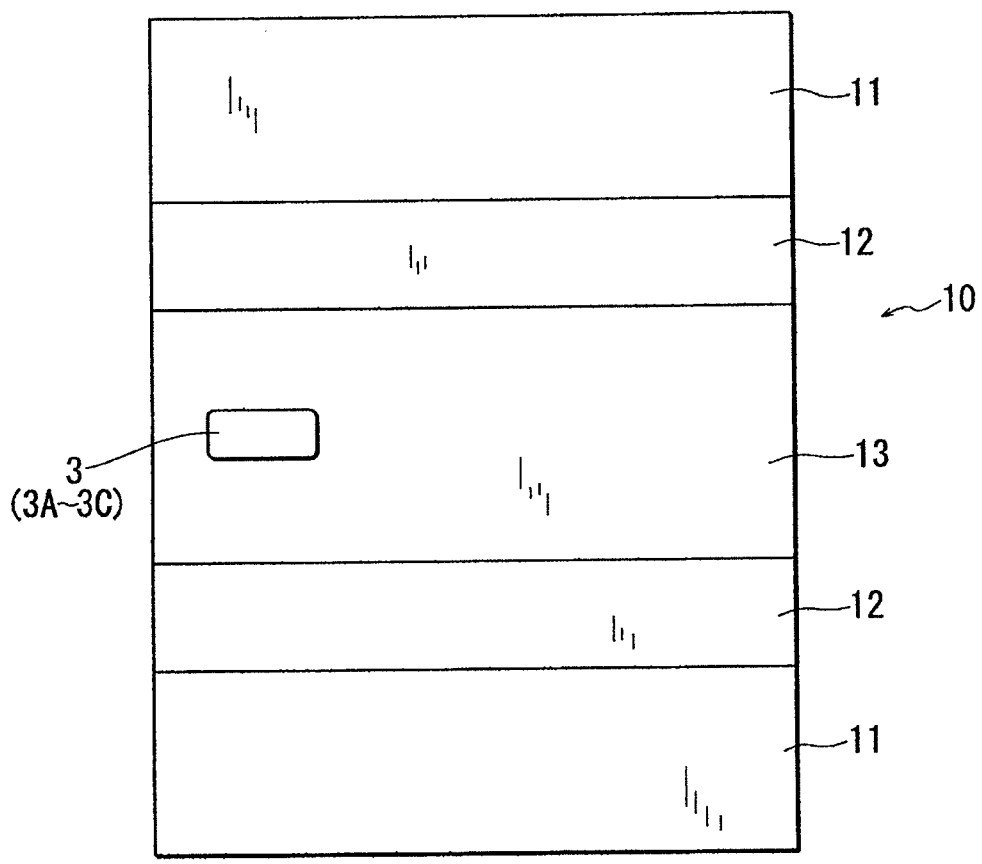
FIG. 14 is a view showing an example where one card is displayed on the third area of a game mat.

FIG. 14 shows an example of a game mat 10 appropriate for a game, which is set for playing a match with two players. The game mat 10 has two areas, i.e., first area 11 and second area 12, exclusively for each player, as well as one common area, i.e. third area 13. The third area 13 is disposed in a square-shaped form in order for the offense to put cards 3 for presenting questions. Each of two second areas 12 is in a square-shaped form and disposed adjoining to one of the opposite sides of the third area 13. Each of two first areas 11 is in a square-shaped form and disposed adjoining to the side of the second area 12 opposite to the third area 13. The game mat 10 is arranged elongating as a whole toward the facing players.

The following is a description regarding an example of playing a game by using plural sheets of cards 3 and the game mat 10. Each player selects in advance the predetermined number of cards 3 for offensive use. Upon selecting the cards 3, it is advisable for each player to select the cards 3 in such a manner that one thinks the one will be able to answer correctly, but the other will not give a right answer. After the selection of the cards, a learning time may be set for memorizing an answer to a question for a given period of time.

The rules for the match game may be established in such a way as described hereinafter. First, the offense presents a question to the defense by displaying the surface of a card 3 and the defense answers the question and then the offense answers the question, too. Secondly, the card is then turned over and the answers of the offense and the defense are decided as right or wrong on the basis of the answer (the right answer) indicated on the back of the card. Thirdly, the point processing and the card processing are performed based on the results of the decision.

The card processing may be conducted generally as will be described hereinafter. When a match is played with one card 3 by the offense and the defense as well as only the offense is right, the offense can additionally put the one card 3 on the first area 11 of the offense on the condition that the one card 3 is a memory card 3A. If the first area 11 of the offense is filled with the predetermined number of cards 3, the card 3 used for this match can be put additionally on the second area 12 of the offense. In this example, the game mat 10 is arranged to put 10 sheets of cards 3 in all without overlapping with one another.

Given the first area 11 is filled with the predetermined number of the cards 3 and a card 3 is put on the second area 12, the COMBO offense can be carried out by simultaneously presenting plural cards 3 indicating reference questions. Upon the COMBO offense, the larger the number of the cards 3 put on the second area 12 is, the larger the number of the cards 3 to be presented is. For instance, the number of the cards 3 which is presented upon the COMBO offense can be increased to the number that is an addition of "one" (1) to the number of the card or cards 13 put on the second area 12. Therefore, the COMBO offense can give the defense larger damage points once so that it is important to perform the COMBO offense as soon as possible in order to win the game eventually.

The offense has an option to use or not use the COMBO offense. In the event where the second area 12 is filled with the predetermined number of cards 3 and a card 3 is put on the second area 12, the offense can use the option as to whether to carry out the COMBO offense using plural cards 3 or to carry out an offense using one card 3. For the COMBO offense, however, no card can be put additionally on the game mat 10. In order to increase the number of cards 13 to be put on the second area 12, the offense has to select an offense using a single sheet of card (memory card 3A). By winning this offense, the number of the cards 13 on the second area 12 can be increased.

The point processing may be conducted generally by giving a point indicated on a card 3 as a damage point to the wrong answerer when either one of the offense and the defense gives a right answer and the other gives a wrong answer (i.e., giving a negative point). When a match game is played using only one card 3, the point to be given as a damage point is the point indicated on the one card 3. When a match game is played in a COMBO offensive style using plural cards 3, a sum of the points (a total point) indicated on all the plural cards 3 is given once as a damage point to the wrong answerer. If both of the offense and the defense would give a right answer or a wrong answer, the match game ends in a draw without changing a point (i.e., maintenance of the status quo). The damage point for the offense and the defense is set each to zero (0) at the start of a game and the game ends as the damage point for either of the players reaches the point set in advance as losing the game. It is thus important to give more damage points to the opposing party in order to win the game.

For the card and point processing, the following is set as an exception. When upon the COMBO offense only the defense gave right answers, the number of the cards 3 put on the first area 11 of the offense is decreased by one card and, in addition, an option is given to the defense whether to give a damage point to the offense or to decrease or recover its own damage point (processing for decreasing the damage point). As the match game ends when the damage points of either one player reaches the predetermined damage points, the defense can select a strategy for keeping its own damage points from the predetermined damage points (i.e., processing for delaying the timing at which to reach the predetermined damage points). The current points (damage points) owned by each player can be always confirmed readily by a tool such as a tip, counter, etc.

Given the above rules, a change of states of the game mat 10 is shown, for example, with reference to FIGS. 14 to 20, inclusive. A description will now be made regarding an example of a process of a match (i.e., a process of a game) with reference to FIGS. 14 to 20, inclusive. Upon playing the game in a match style, a first player going to play first and a next player to play next may be decided by throwing a die. As the match starts, the first player acting as an offense in this match puts one card 3 out of the cards 3 held on hand with its surface (the side indicating a question) up on the third area 13, as shown in FIG. 14. Then, the next player acting as a defense in this match answers the question of the card 3 put on the third area 13 and thereafter the offense answers the same question, too. The back of the card 3 is kept unseen from the both players until the both players have given their answers, Once both of the offensive and the defense have given their answers, the card 3 put on the third area 13 is turned over to show the answer (right answer) indicated on the back of the card 3, and the right answer is confirmed. The answers of the offensive and the defense are judged as right or wrong on the basis of the question confirmed, and they are subjected to processing in accordance with the result of judgment. If the answers of the offense and defense are both right or wrong, the game ends in a draw and the card 3 used for this match is removed from the game mat 10 and no point is given to either player.

Figure 15:
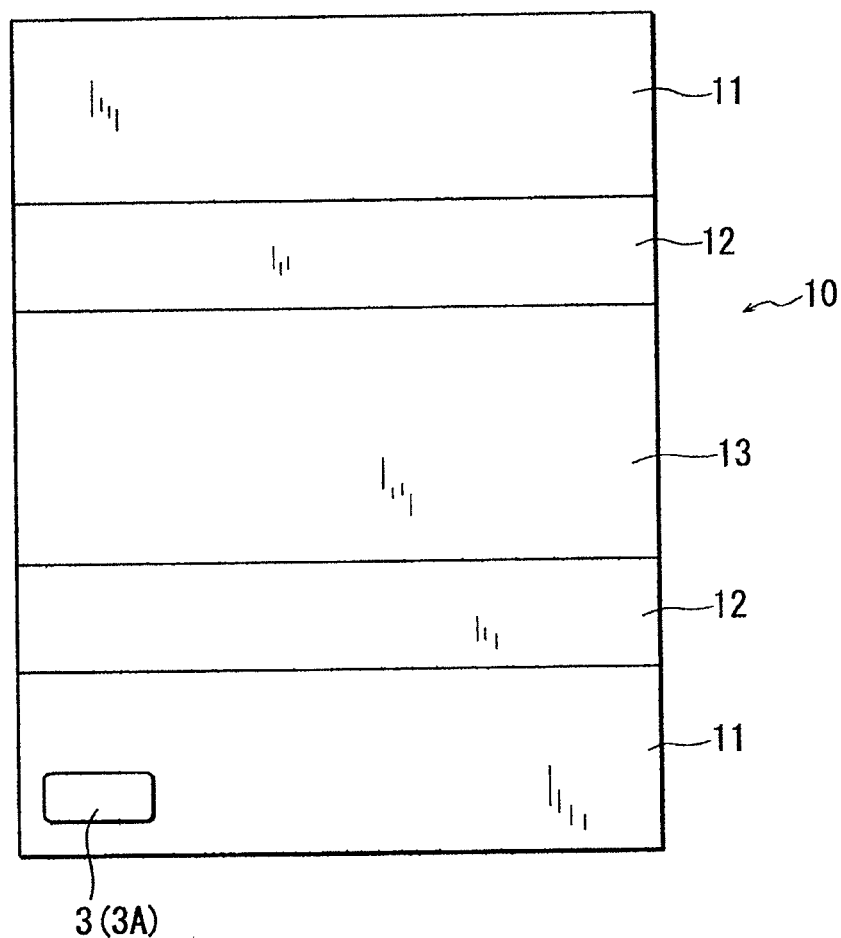
FIG. 15 is a view showing an example where a game advances from the state of FIG. 14 to a state where one card is put on one of the first areas.
Figure 16:
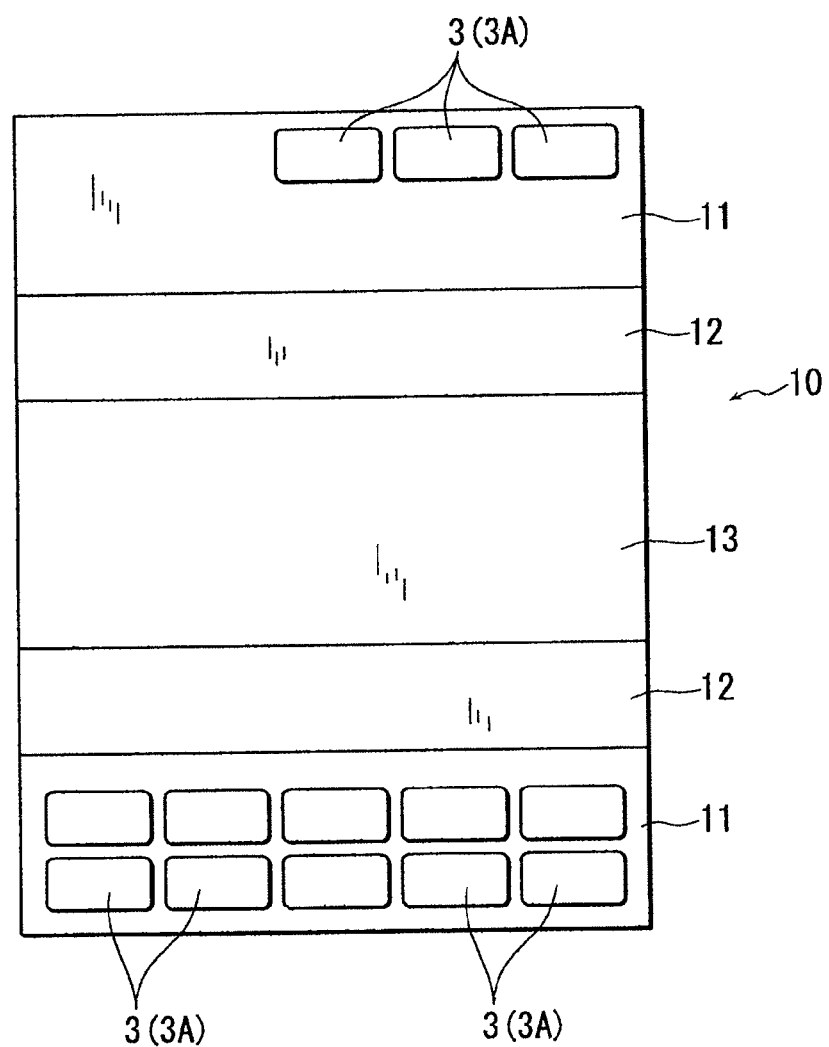
FIG. 16 is a view showing an example where the game advances from the state of FIG. 15 to a state where one of the first areas is filled with the predetermined number of cards.
Figure 17:
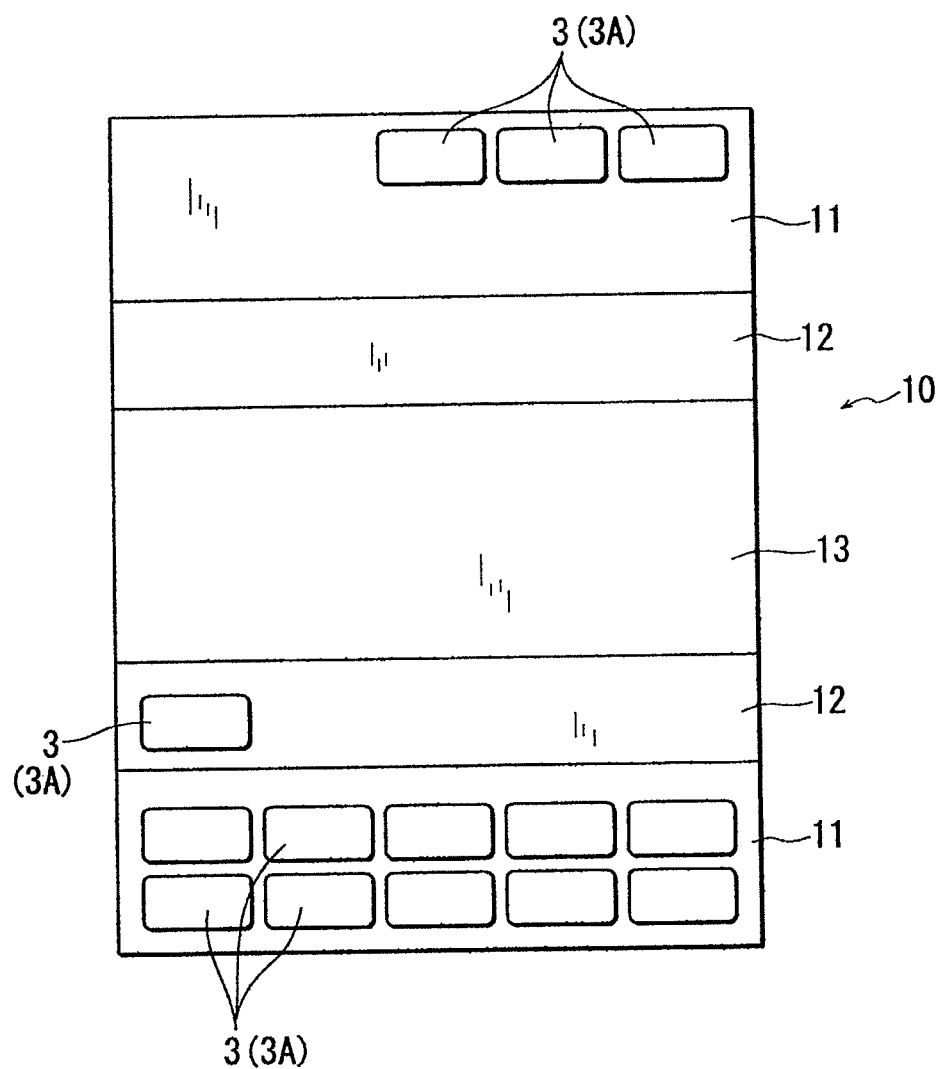
FIG. 17 is a view showing an example where the game advances from the state of FIG. 16 to a state where one card is put on one of the second areas.
Figure 18:
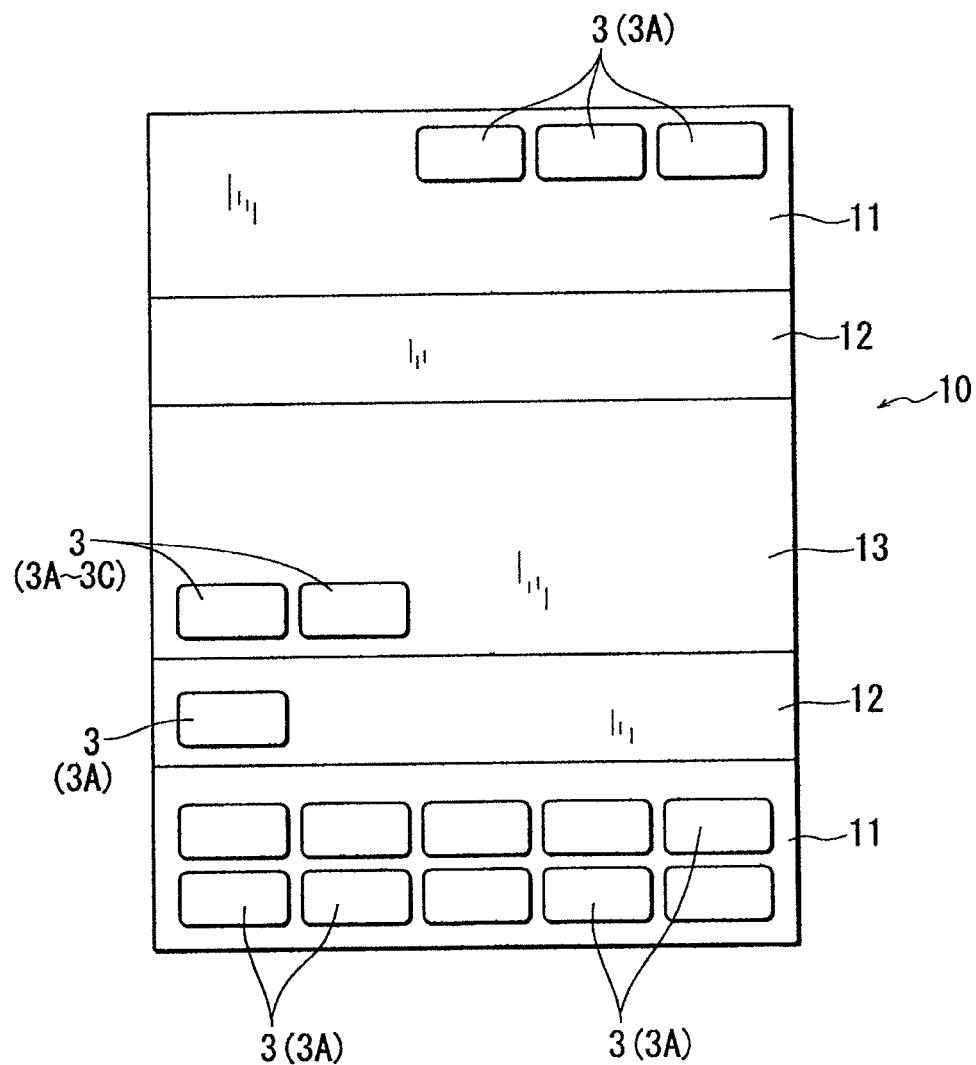
FIG. 18 is a view showing an example where the game advances from the state of FIG. 17 to a state where one card is put on one of the second areas and two cards are put on the third area.

If only the offense would give a right answer upon the offense using the memory card 3A, the memory card 3A used in this match is put on its own first area 11, as shown in FIG. 15. FIG. 15 shows a state in which the card 3 used in this match is put on the first area 11 first at the beginning of the match. When this first match was over, the offense and the defense take turns and the defense in the previous match then takes the offense's turn in a next match. As a result of the repetition of turns of the offense and the defense, the first area 11 on one side may be turned into a state in which it is filled with the predetermined number of the cards 3, as shown in FIG. 16. If only the offense would give a right answer in the state where the first area 11 of the offense would be filled with the predetermined number of cards 3, one card 3 is additionally put on the second area 12 of the offense as shown in FIG. 17. Moreover, if the player having one additional card on its own second area 12 would have played a match as an offense and used the COMBO offense, for example, as shown in FIG. 18, two cards 3 indicating reference questions are put side by side on the third area 13 (i.e., the number of the cards corresponding to the number of the cards added by one card to the number of the card put previously on the second area 12). In the state as shown in FIG. 18, the defense is required to answer the questions presented on the cards 2 consecutively in the order of the cards 3.

Figure 19:
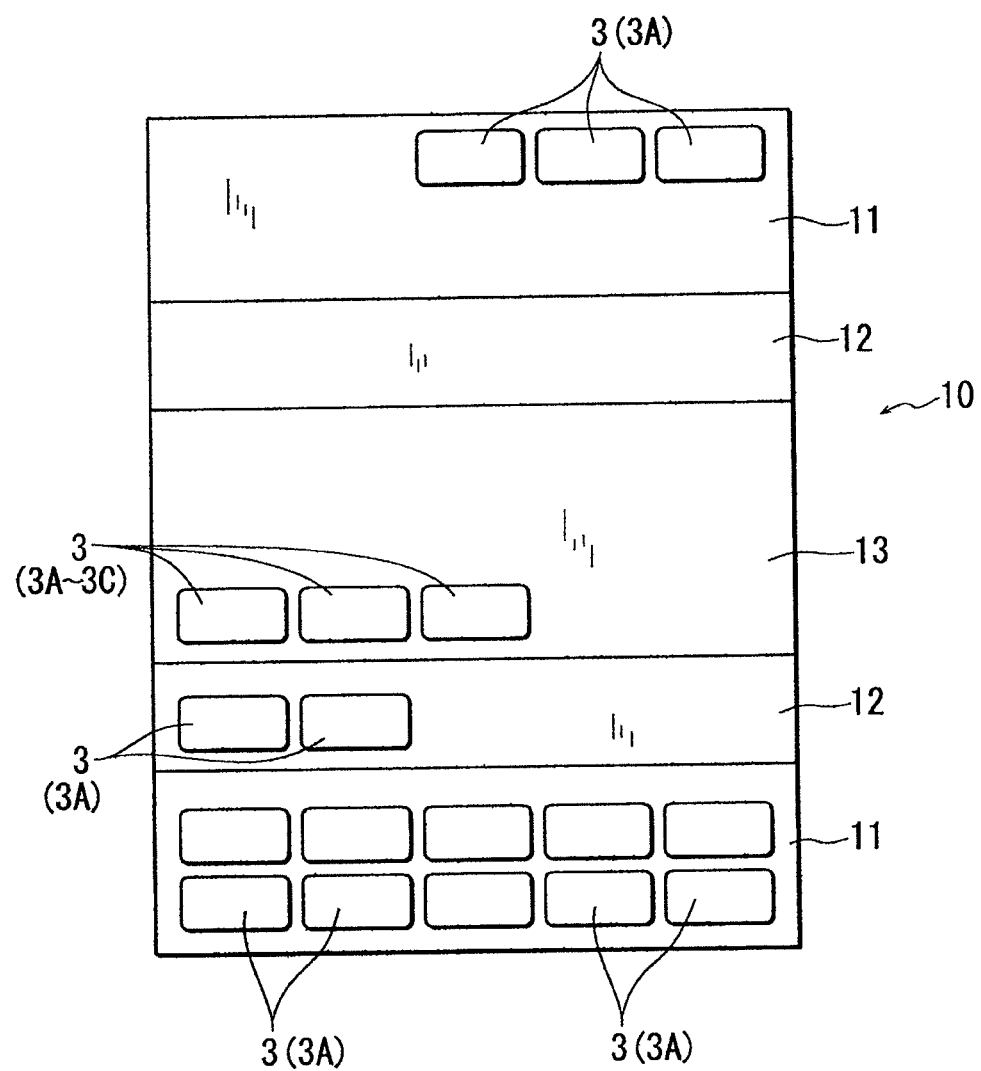
FIG. 19 is a view showing an example where the game advances from the state of FIG. 18 to a state where two cards are put on one of the second areas and three cards are put on the third area.

When the player having one card 3 on its own second area 12 takes the offense's turn after the match was over in the state as shown in FIG. 18, selects a match using one card and only the offense gave a right answer, the card 3 used in this match is put additionally on its own second area 12, as shown in FIG. 19, thereby permitting a next COMBO offense with three cards 3 indicating reference questions.

Figure 20:
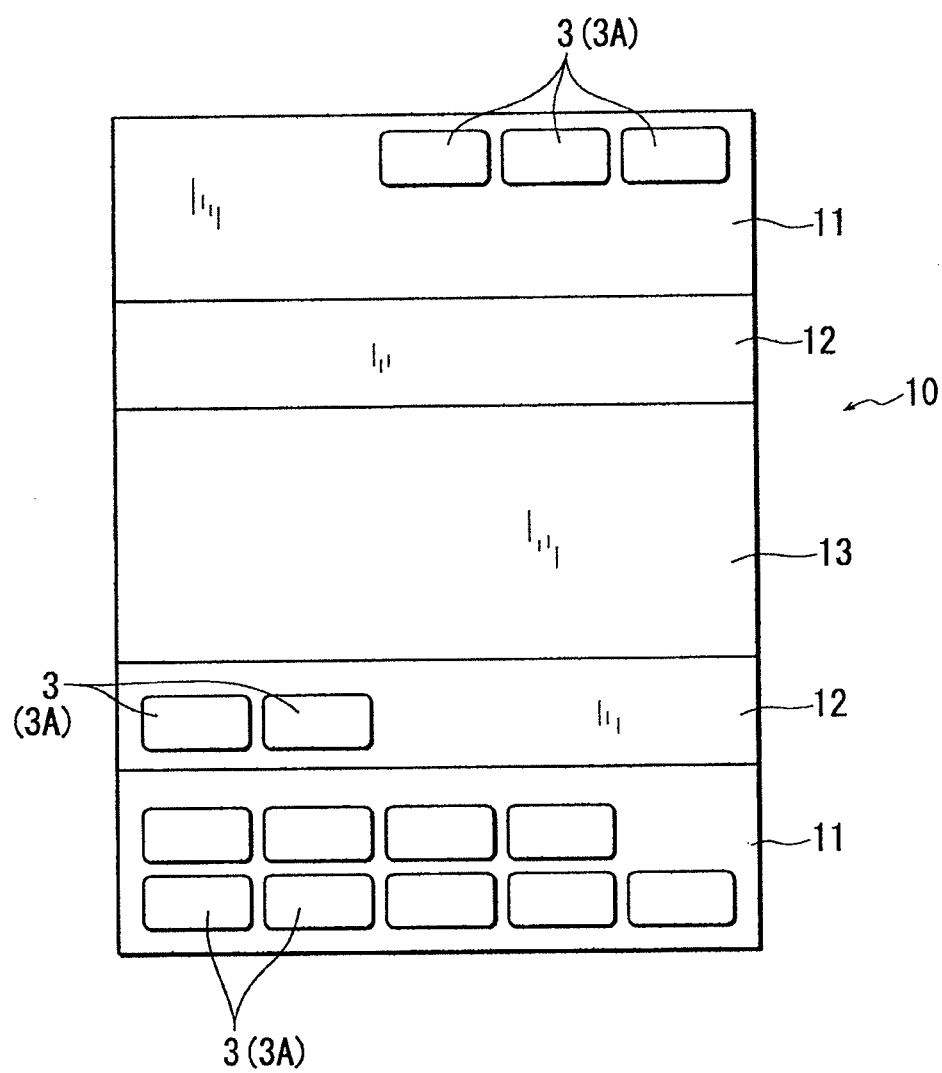
FIG. 20 is a view showing an example where the game advances from the state of FIG. 19 to a state where two cards are put on one of the second areas and one card is deleted from one of the first areas.

In the event where, after the match was over in the state as shown in FIG. 19, then the player who has the additional card 3 on the second area 12 takes the offense's turn, plays a COMBO offense and only the offense gives a wrong answer, the number of the cards 3 on the first area 11 of the offense is decreased by one, as shown in FIG. 20. This indicates that, even if the card 3 is put on the second area 12, the first area 11 is not filled with the predetermined number of the cards 3 so that the COMBO offense is prohibited and an offense using one card 3 only is permitted. It is needless to say that, as there is the card 3 on the second area 12, a COMBO offense is permitted again if the state would be recovered in which the first area 11 would be filled with the predetermined number of the cards 3 by the subsequent offense using one card.

By repeating the offense-and-defense matches in the manner as described above, one of the players who has the damage points over the predetermined point value is decided as a loser in this game.

Figure 21:
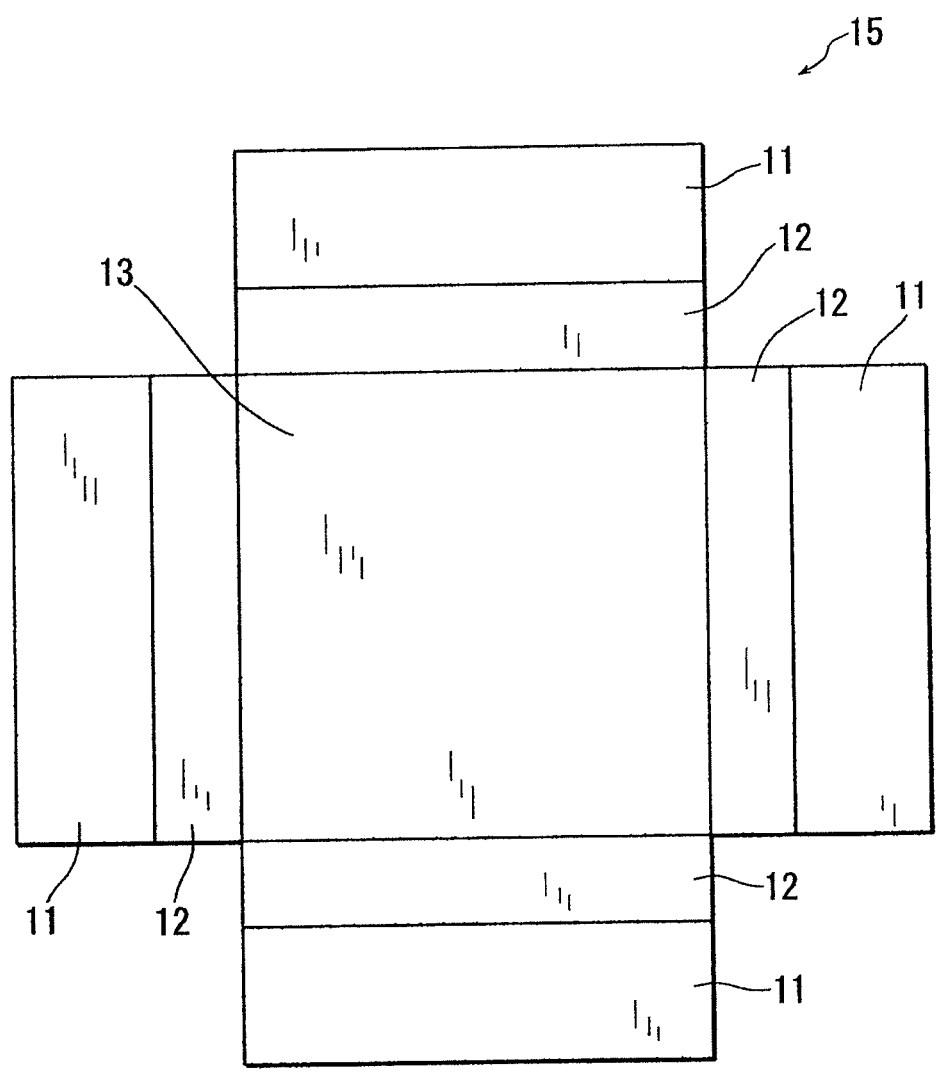
FIG. 21 is a plane view showing another example of a game mat.

FIG. 21 shows a variant of the game mat that permits four players to meet a match. As shown in FIG. 21, a game mat 15 is arranged such that the third area 13 is in a regularly square form and the second area 12 is disposed adjacent to each side of the third area and the first area 11 is disposed adjacent to one side of each of the second area 12 opposite to the third area 13. Upon playing a match, supposed that four players A, B, C and D meet clockwise on the respective sides of the game mat 15 and, for instance, a first offense-and-defense match is done between the players A and B, a next match between the players B and C, a third match between the players C and D, and a fourth match between the players D and A. One game is carried out as a whole in the manner as above and matches are repeated until either one has the predetermined damage points. At this point, the game becomes over and the players rank first, second, third and fourth in the ascending order of damage points in the game. The game mat 15 may preferably be made of a flexible material such as cloth, etc. so that it may be folded to a smaller size when it is not used.

The following is a description regarding an example of a match system utilizing a computer and a network with reference to FIGS. 22 to 28, inclusive. The rules of the game are the same as those of the game system using physical cards as described with reference to FIGS. 1 to 21. In this example, questions and answers presented using cards and game mat 10 can be displayed on a display screen used by each player.

Figure 22:
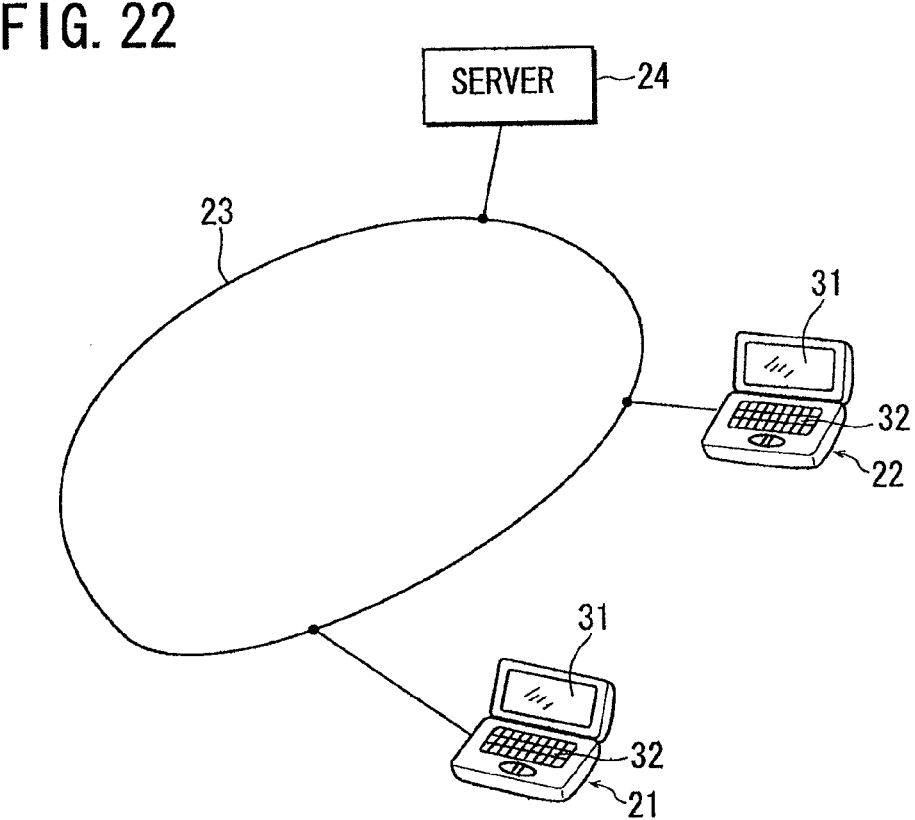
FIG. 22 is a view showing an example where plural user's terminals and a server are connected to each other through network.

FIG. 22 shows a network system in which terminals 21, 22 for use by each match player are connected through internet 23 to a server 24. As the user's terminal, each player may use a personal computer or a game machine. In this example, a personal computer with a WWW browser is used. The display screen of each user's terminal 21, 22 is indicated by reference numeral 31, and a keyboard 32 is used as a manually operable input means. An audio unit such as microphone may also be used.

Figure 23:
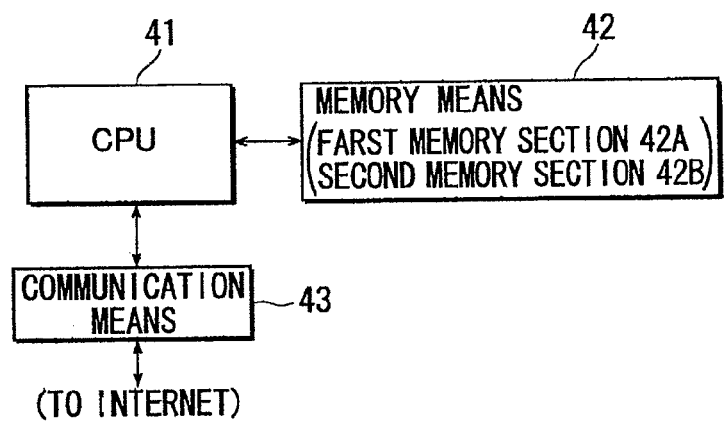
FIG. 23 is a view showing a brief illustration of a main part of the internal configuration of a server.

The server 24 can send and receive XTML files (including images; applicable to below) and XML files and, as main function, it is equipped with CPU 41 as a processing means, memory means 42 such as hard disk drive, etc., and communication means 43, as shown in FIG. 23. The memory means 42 has a first memory section 42A and a second memory section 42B. The first memory section 42A can store a very large number (e.g., from several thousands to several ten thousands) of questions and answers as well as card numbers, degrees of difficulty, degrees of importance, points, and reference card numbers. The second memory section 42B is to temporarily memorize only a portion of the questions, etc. selected by the match players among the questions, etc. memorized in the first memory section 42A.

CPU 41 presents information such as questions and answers to the user's terminals 21, 22 between them in order to save a burden imposed on them, carry out point and card processing, and display the results on the display screen 31. The keyboard 32 for each user's terminal 21, 22 is to input the answers and conduct various operations for selection.

The functions of the server 24 may be presented to the match players as a pay service or a service to the registered members. In this example, they work as a database memorizing the questions and answers and it is installed with programs for carrying out various processing required for the game. By using the functions of the server 24, the players can enjoy a match game using a card system with the user's terminals 21, 22. In other words, the user's terminals 21, 22 have no burden of memorizing a very large number of questions and answers and are required to install none of all programs for various processing for proceeding with the game, but to memorize only a function for exchanging information with the server 24 and a program transmitted from it (particularly for sending a response).

Figure 24:
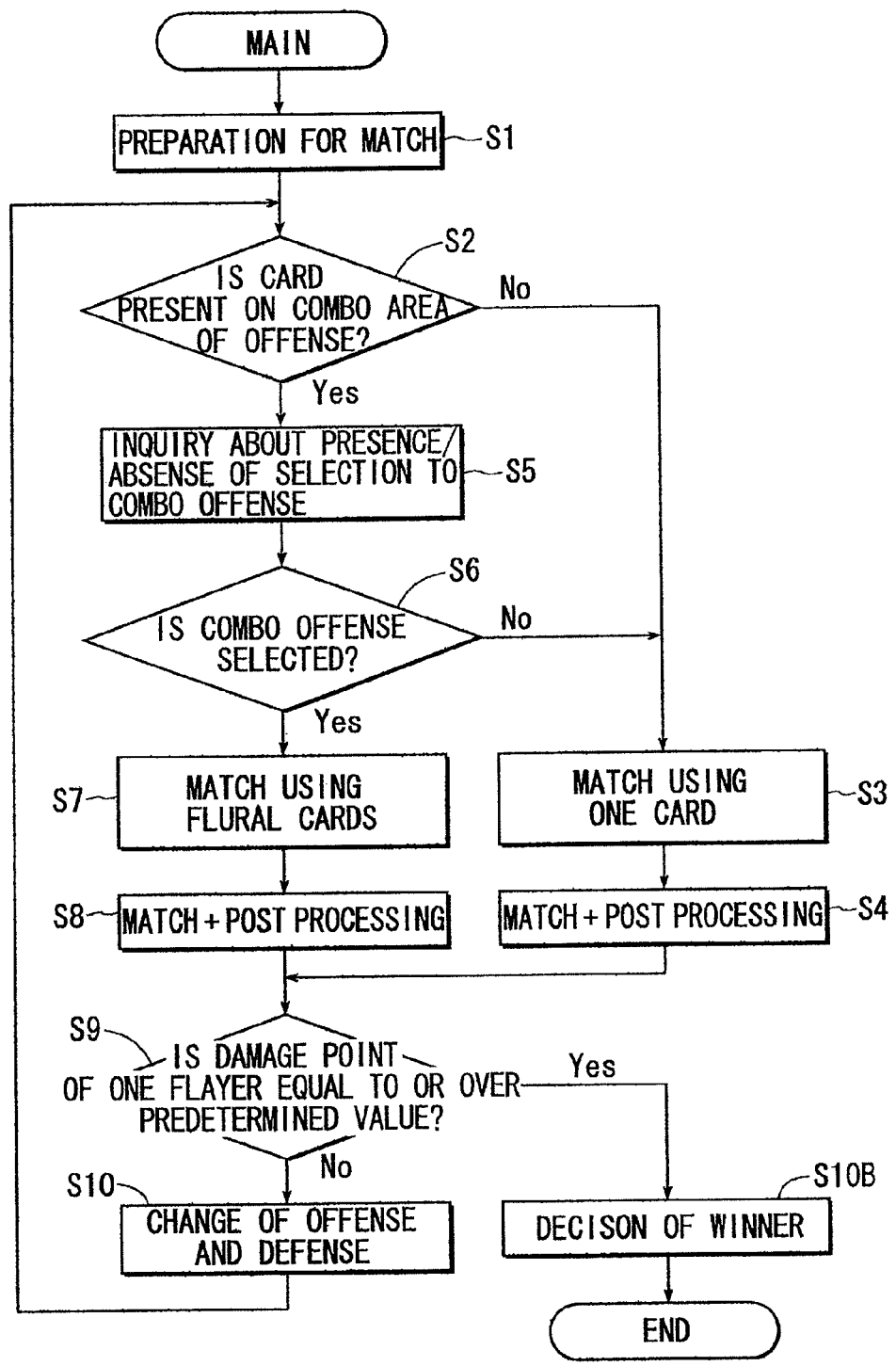
FIG. 24 is a flowchart showing a control example of a learning apparatus.

Given the above, the functions of the server 24 will be described with reference to flow charts of FIGS. 24 to 28, inclusive. In the following description, reference symbol "S" means step. FIG. 24 is a main flow chart in which a game is prepared at S1 in a manner as described hereinafter. Then, at S2, it is judged whether a card 3 is put on a second area 12 acting as a COMBO area of the offense. At the beginning, the judgment at 32 is NO, followed by S3 at which an offense-and-defense match is performed by presenting a question using one card 3 and giving an answer thereto. Then, at S4, the post-processing of the match, that is, card and point processing, is carried out.

When the judgment at S2 is YES, the step goes to S5 where an inquiry is given to the user's terminal of the offense as to whether to select COMBO offense or not. Thereafter, at S6, the result of the selection at S5 is judged whether the COMBO offense is selected or not. When the judgment at S6 is NO, on the one hand, the step returns to S3. When it is judged YES at S6, on the other, the COMBO offense using plural cards 3 indicating reference questions is conducted at S7. Thereafter, at S8, the post-processing, i.e., card and point processing, is carried out based on the results of the match at S7.

After S4 or S8, it is judged at S9 whether the total point value of one player is over the predetermined point value or not. If NO at S9, on the one hand, it is judged that neither victory nor defeat are yet decided in this match, then the step goes to S10 at which the processing for turning the defense to the offense is carried out, followed by returning to S2. If YES at S9, on the other, it is judged that the victory and the defeat has been decided, then the step goes to S10B at which the winner and the loser of the game are decided and this decision is displayed on the display screen 31.

Figure 25:
FIG. 25 is a flowchart showing a control example of a learning apparatus.

FIG. 25 shows details of the processing at S1. As shown in FIG. 25, players and a subject for a match are decided at S11. Candidates for the match are required to send mails from either of the user's terminals 21, 22 to the server 24, stating of an intent to meet the match, a subject desired for the match, their own profiles including their learning levels, etc. and conditions for match requirements including a learning level, etc. of a player desired to meet the match. The server 24 decides match players when two candidate players who have selected the same subject and satisfy the conditions for match requirements have appeared, and sends mails to the match players decided and to each candidate player. A more description about the decision of the players will be omitted because it can be done using current network in substantially the same manner as various commercial match games. A point rate may be changed in accordance with levels of the match players. More specifically, the processing may be done in advance to the extent that, for instance, a damage point may be given as a basic point to a player having a higher learning level by setting the point or points (the point value) to be given for each question as a basic point. The damage point to be given to a beginner may be set to, for example, 50% with respect to the basic point.

At S12, the first player who plays an offense first and the second player who plays next are decided. This decision may be made, for instance, by displaying a die on the display screen 31 of the user's terminals 21, 22 of each player and permitting each player to operate the keyboard 32 to decide who plays first by the larger or smaller spots of the die.

After S12, at S13, the server 24 presents a tree chart of a large number of questions (displayed by cards) in the first memory section 42A to the first player through the display screen 32 of the user's terminal 21 (or 22) of the first player. At the same time, the first player is required to select holding cards from the cards presented in the tree chart. Thereafter, at S14, for instance, the first player may select a total number of 100 cards including 50 memory cards 3A and a total of 50 cards of application cards for quick answer style 3B and for full type 3C, and the total number of 100 cards is decided as the holding cards of the first player and memorized in the second memory section 42B. If all the questions could not be presented in a sum-up way simultaneously, the questions may be presented portionwise by repeated selections. If a sum-up display is difficult, a batch display of plural portions of the cards may be possible although the sum-up display is preferred. At S15 and S16 after S14, the next player is required to select holding cards in the same manner as the first player did and they are memorized in the second memory section 42B.

At S17 after S16, a game mat 10 is displayed on the display screen of each of the user's terminals 21, 22, as shown in FIGS. 14 to 20 (an indication of an initial state of the game mat 10 with no card 3 put thereon). Thereafter, at S18, a statement of the start of a game is displayed on the display screen 31 of each player.

Figure 26:
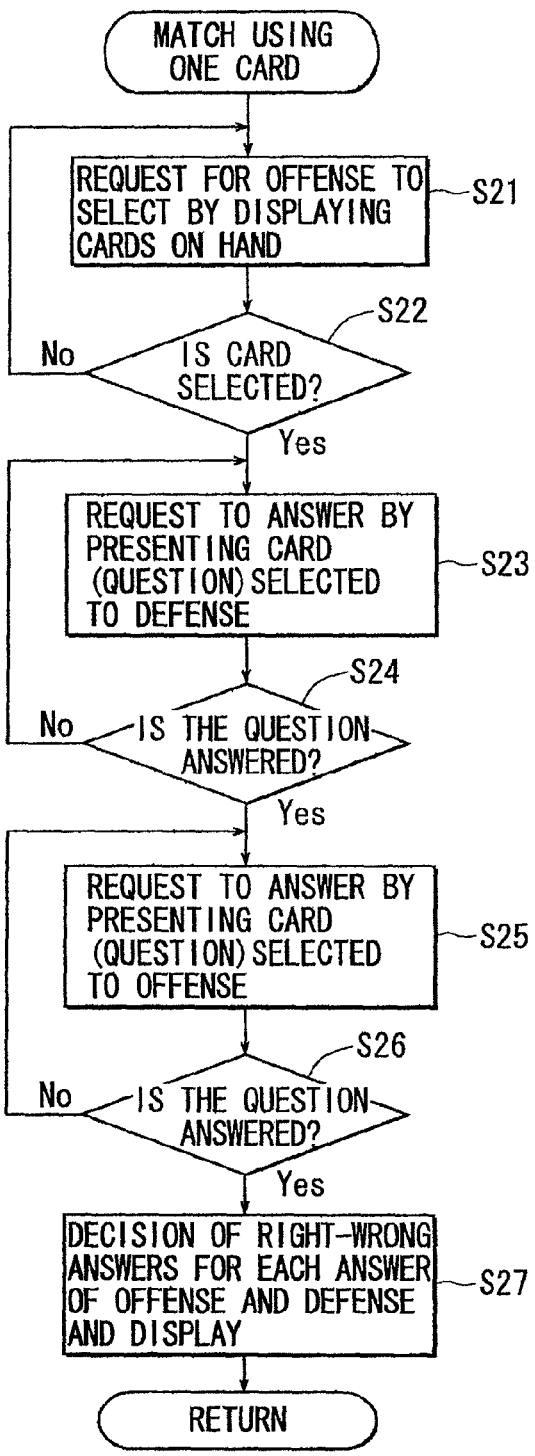
FIG. 26 is a flowchart showing a control example of a learning apparatus.

Details of S3 in FIG. 24 are shown in FIG. 26. At S21 of FIG. 26, the offense (i.e., the first player in the match) is required to select one card from its holding cards memorized in the second memory section 42B and display it on the display screen 31 of its own user's terminal 21 (or 22). Thereafter, it is judged at S22 whether one card is selected or not. If NO at S22, the step returns to S21.

If YES at S22, a question indicated on the surface of one card selected is displayed on the display screen 31 of each of the user's terminals 21, 22 and an image indicated on the surface of the card is transmitted in a state as shown in FIG. 14 to the user's terminals 21, 22 from the server 24, requiring an answer to the question displayed to the defense. At S24 after S23, it is judged whether the answer is given from the defense or not. If NO at S24, the step returns to S23.

If YES at S24, an answer to the question is also required to the offense, too, by processes at S25 and S26. Once the answer from the offense has been confirmed at S26, the step goes to S27 at which it is judged whether the answers by the offense and the defense are right or wrong (incorrect). At S27, the card with its surface displayed thereon is turned over to indicate an answer (i.e., a right answer) displayed on its back and the right answer is displayed on the display screen 31 of each of the user's terminals 21, 22, sending an image of the back of the card to each user's terminal 21, 22 from the server 24. By the processing at S27, each player can recognize immediately and accurately whether the answer by each player is right or wrong. The right-wrong answers by the offense and the defense can be automatically judged by a computer by comparing the answers to the questions corresponding to the questions memorized in database and the result of judgment is displayed on the display screens of the user's terminals 21, 22. It is also possible to display the answer to the presented question on the display screen from database and to allow the players to decide whether the answers are right or wrong. Input operations for the right-wrong answer by the offense or the defense may be conducted separately.

Figure 27:
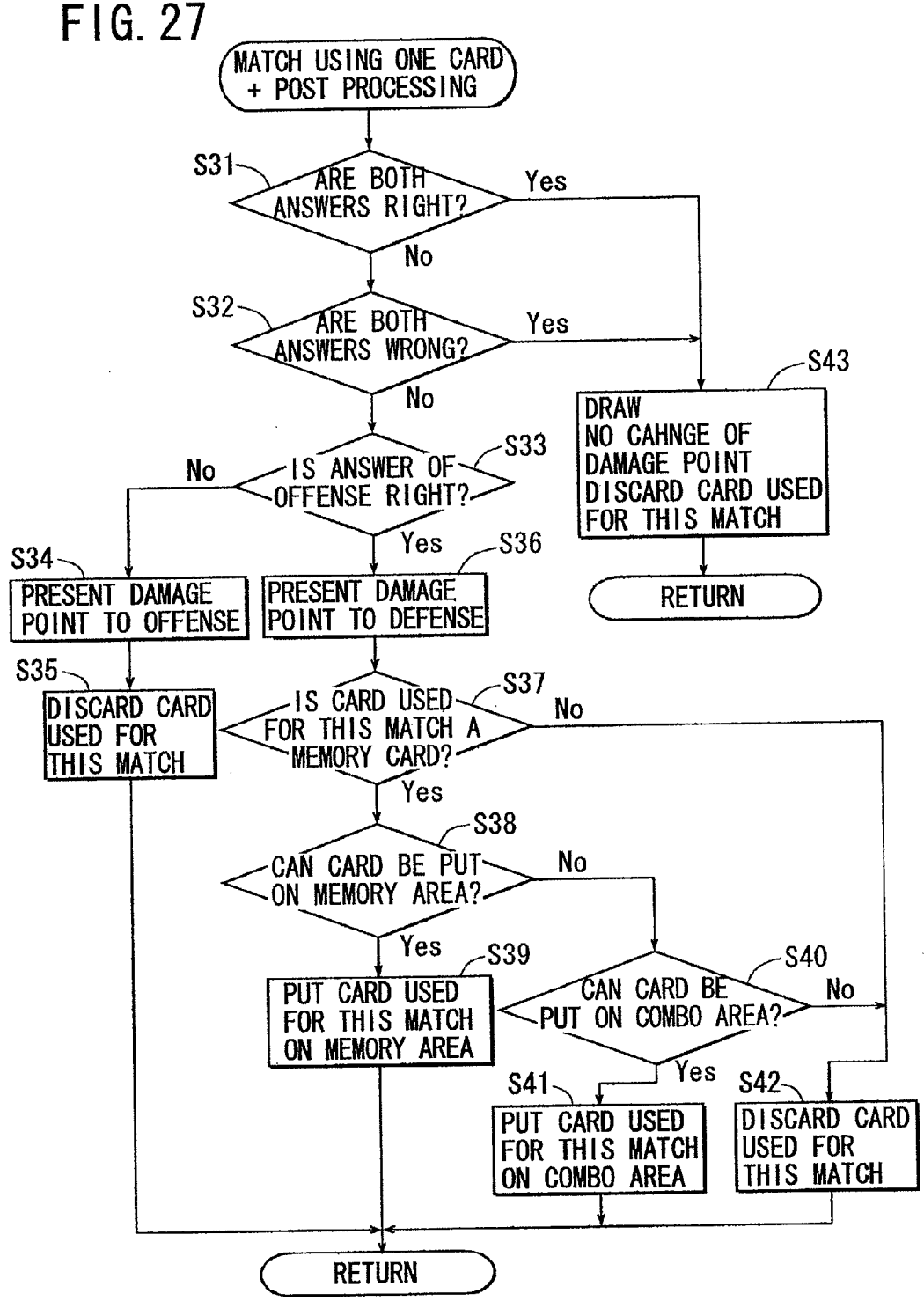
FIG. 27 is a flowchart showing a control example of a learning apparatus.

FIG. 27 shows details of S4 of FIG. 24. As shown in FIG. 27, it is judged at S31 whether the answers by both of the offense and the defense are right or not. If NO at S31, it is further judged at S32 whether both answers are wrong. If NO at S32, it is judged that only either one of the offense and the defense is right and the step goes to S33 at which it is judged whether the answer by the offense is right or not. If NO at S33, that is, it is judged that only the answer by the defense is right, a damage point is given to the offense at S34 (renewal), followed by proceeding to S35 at which the card used for this match is discarded. The processing at S35 may be done by deleting the card (question) used for this match from the second memory section 42B and making the state of the card used for this match invalid and useless any longer in this game (this can also be applied to the following processes).

If YES at S33, that is, if only the answer by the offense is right, the step goes to S36 at which a damage point is given to the defense (renewal). Thereafter, it is decided at S37 whether the card used for this match is a memory card 3A or not. If YES at S37, it is decided at S38 whether a memory area (first area 11) is in such a state that the card can be put more. If YES at S38, at S39, the card used for this match is put on the memory area (for example, the state of FIG. 15).

If NO at S38, it is decided at S40 whether the card can be put more in a COMBO area (second area 12) or not. If YES at S40, the card used for this match is put on the COMBO area at S41 (for example, the state of FIG. 17). If NO at S37 or S40, the card used for this match is discarded (deleted from the second memory section 42B).

If YES at S31 or S32, this match ends in a tie. At S43, the processing for the drawn match is conducted. In other words, the state of status quo is kept without changing damage points (renewal), followed by discarding the card (question) used for this match (deletion from the second memory section 42B).

The details of S7 in FIG. 24 are substantially the same as in FIG. 26 illustrating the details of S3. As shown in the drawing, plural cards are displayed on the display screen 31 in the predetermined order to answer all the questions in this order of the cards. In deciding whether the answers are right or wrong, the final answer is judged right when all the questions are answered correctly and, if a certain answer is incorrect, it is decided that the final answer is incorrect.

Figure 28:
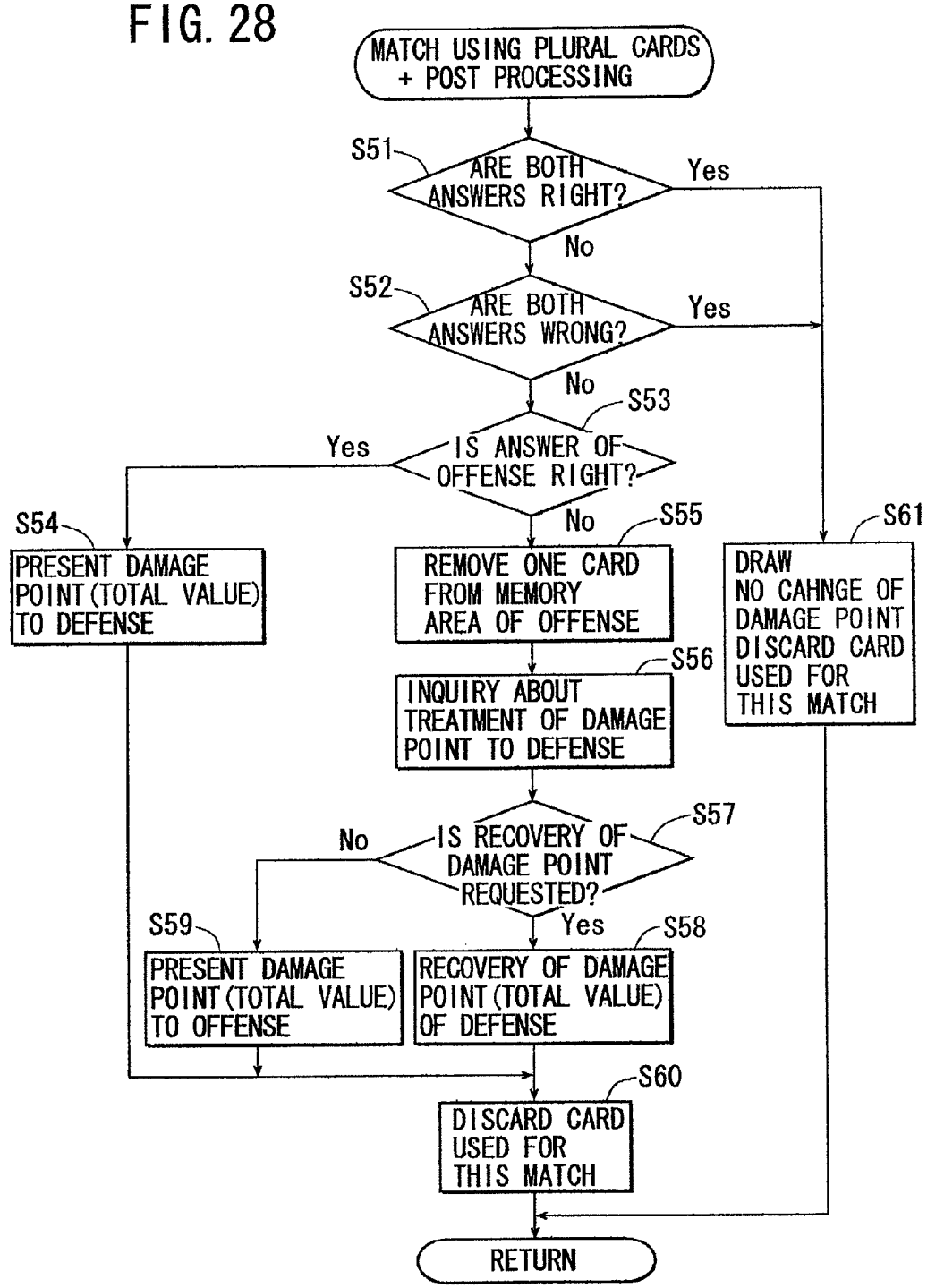
FIG. 28 is a flowchart showing a control example of a learning apparatus.

FIG. 28 shows the details of S8 of FIG. 24. The processing of S51 and S52 at S61 of FIG. 28 corresponds to the processing of S31, S32 and S43 of FIG. 27, respectively. If YES at S53 corresponding to S33 of FIG. 27, that is, when only the offense answers right, a damage point is given to the defense at S54 (renewal). The damage points are a sum of the individual damage points set on the plural cards (questions). For a player having a higher learning level, the damage points may be set as the total points while for a beginner, the damage points may be set as 50% of the total points.

If NO at S53, that is, only the defense answers right, the step goes to S55 at which one card is deleted from the memory area (first area 11) of the offense (for example, the state of FIG. 20). Thereafter, at S56, an inquiry is made on the display screen 31 of the defense as to whether a recovery of the damage points is desired or not. It is then decided at S57 whether an answer to the inquiry is a request for recovery of the damage points or not. If YES at S57, the damage points of the defense are recovered at S58. The points to be recovered corresponds to a sum of the damage points set individually on the plural cards. If NO at S57, the damage points are given to the offense (renewal). It is needless to say that, as the damage points are a sum of the damage points set on each of the plural cards (questions). After S58 or S59, the card (question) used for this match is discarded at S60 (deleted from the second memory section 42B).

Figure 29:
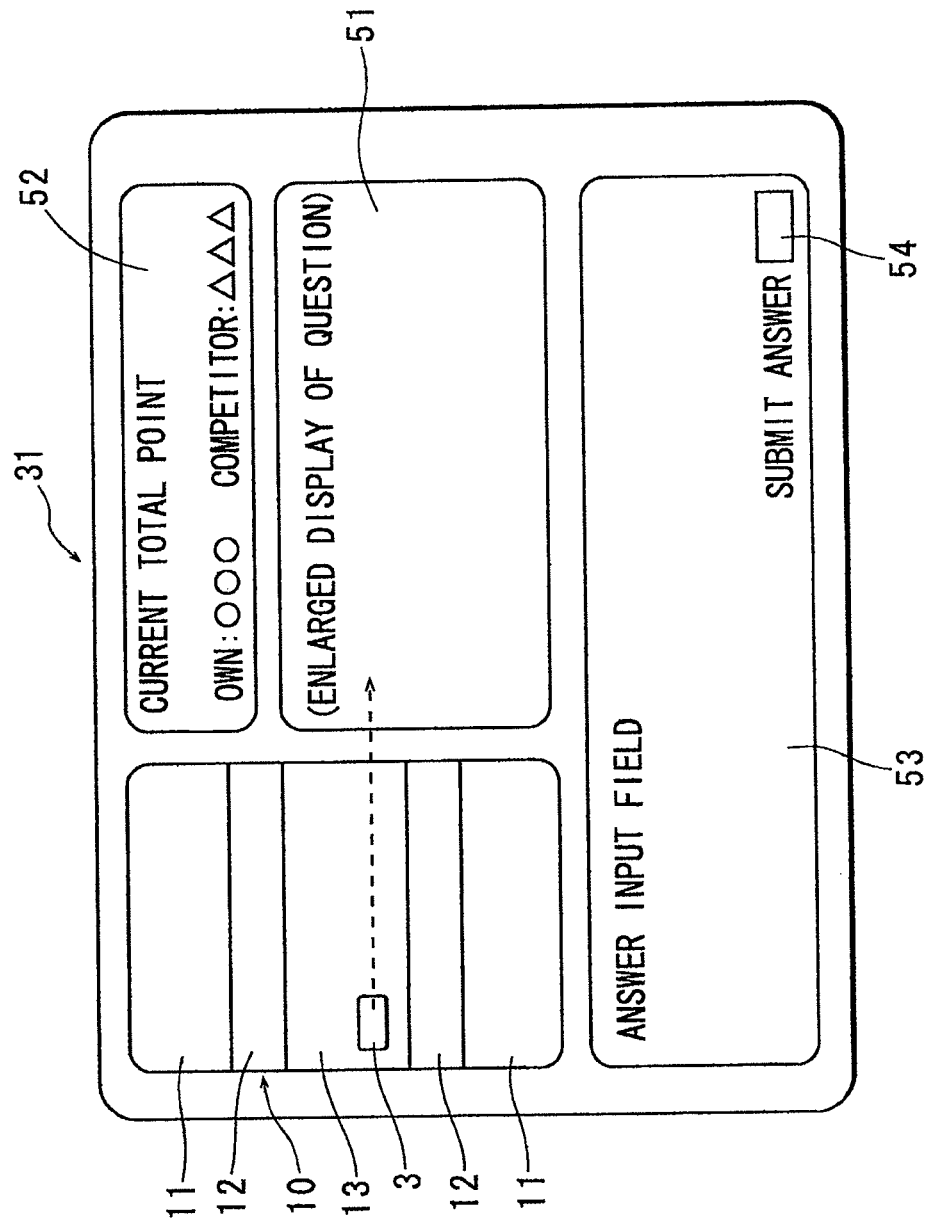
FIG. 29 is a view showing an example of a game mat, questions and so on to be displayed on the display screen of a user's terminal.

A description will be made hereinafter regarding an example of display on the display screen 31 on the side of the user's terminals 21, 22 with reference to FIGS. 29 to 31, inclusive. FIG. 29 shows an example of display when a question is presented (corresponding to S23 and S25 of FIG. 26). In FIG. 29, the game mat 10 is displayed in a reduced form, in which a card (the surface) is presented as a question on the third area 13. As the question is difficult to see, a question display field 51 for displaying the question in an enlarged form is separately disposed adjacent to the game mat 10. On the question display field 51, a degree of difficulty, a degree of importance, reference card numbers, etc. can be displayed. A point display field 52 is also disposed displaying current points of each player indicating the status of relative merits of victory or defeat. At the lowest side, an answer input field 53 is displayed after a question has been inputted. After an answer has been inputted in the answer input field 53, the answer inputted is then submitted to the server 24 by putting a tick in an answer mailing box 54 disposed on the lower right side.

Figure 30:
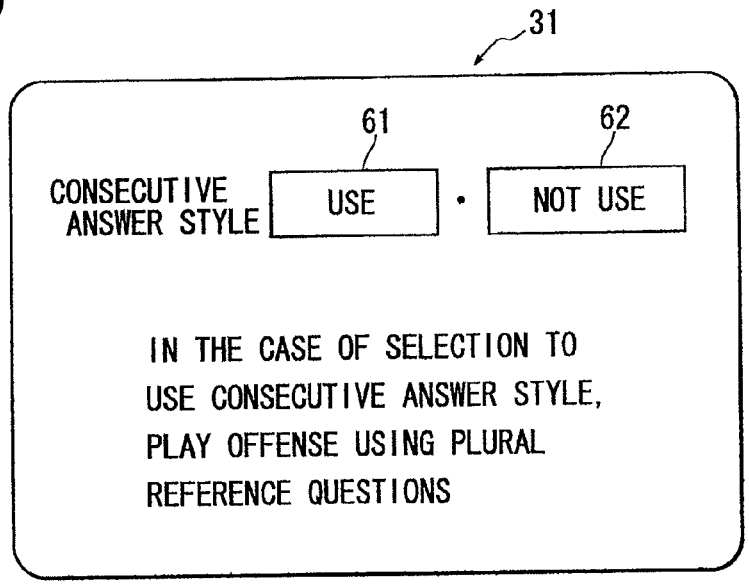
FIG. 30 is a view showing an example of displaying an inquiry about a selection of an offense in a consecutive answer style to be displayed on the display screen of a user's terminal.

FIG. 30 shows an example of a display on the display screen 31 when an inquiry is made as to whether a COMPO offense, that is, an offense of consecutive answer style, be selected or not (corresponding to S5 of FIG. 24). In FIG. 30, the term "To Use Consecutive Answer Style" or "Not to Use" are displayed to select (or click) either one of a box 61 indicating "To Use" and a box 62 indicating "Not to Use" and to submit the selected contents to the server 24 (i.e., URL is embedded in the boxes 61, 62 to submit to the server 24). The specific contents of offense are displayed in the parentheses in order to draw attention when "To Use" is selected in the consecutive answer style.

Figure 31:
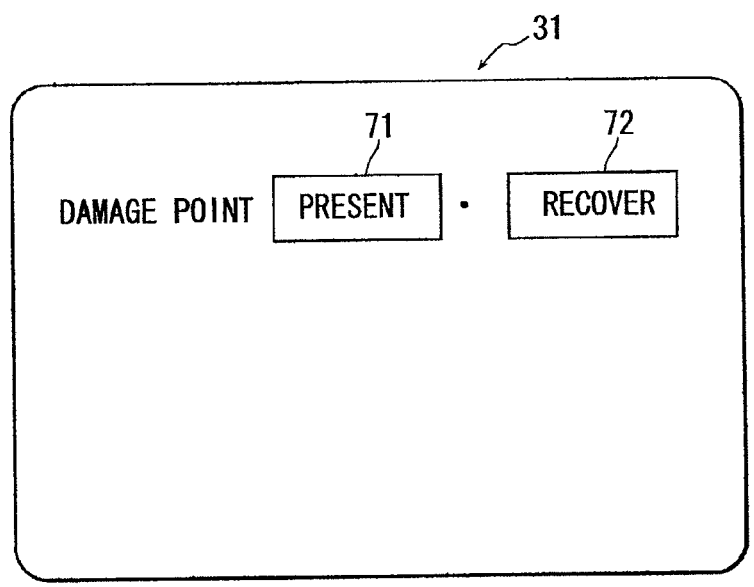
FIG. 31 is a view showing an example of displaying an inquiry about a selection of processing a damage point to be displayed on the display screen of a user's terminal.

FIG. 31 shows an example of a display on the display screen 31 when an inquiry about selection of processing of damage points is made when only the defense has answered correctly upon the COMBO offense, i.e., an offense in a consecutive answer style. (corresponding to S56 of FIG. 28). As shown in FIG. 31, the term "Give Damage Points/Recover" are displayed and a box 71 indicating "Give" and a box 72 indicating "Recover" are displayed. By selecting (clicking) either one of the boxes 71, 72, the contents selected are submitted to the server 24.

Figure 33:
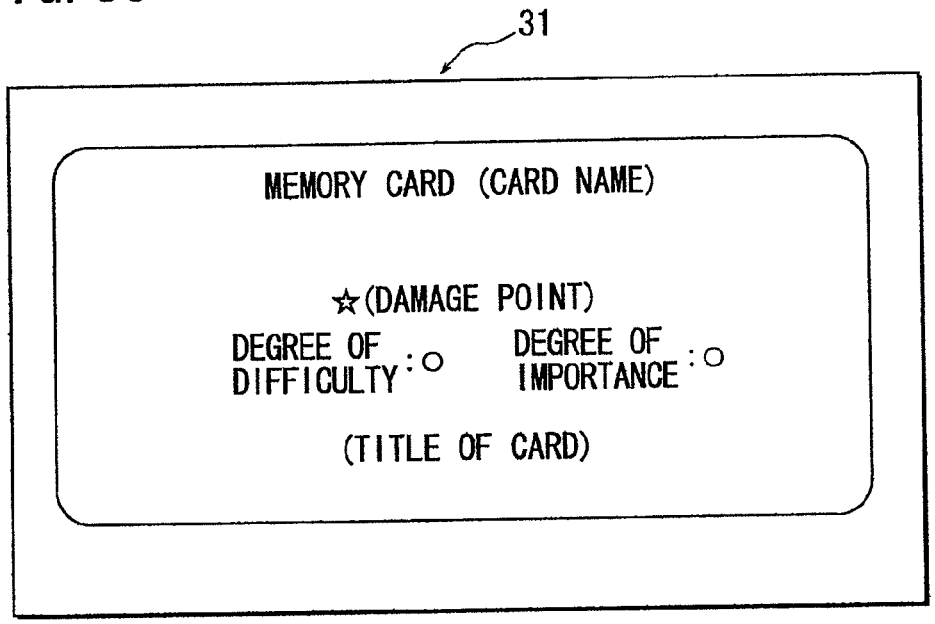
FIG. 33 is a view showing an example of displaying a state in which one of database (items) of FIG. 32 is clicked for selection.
Figure 34:
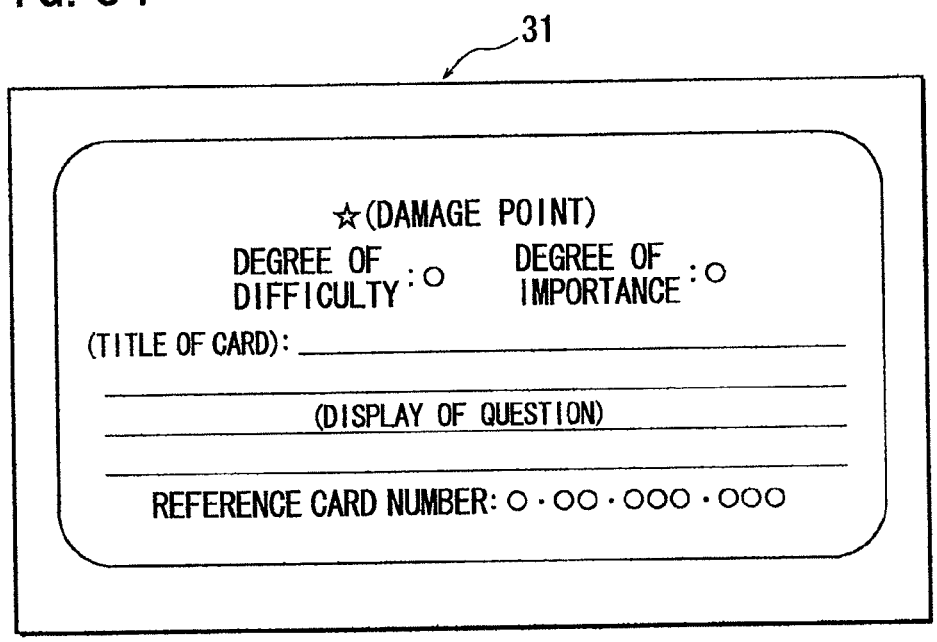
FIG. 34 is a view showing a state in which clicking is performed in the state of FIG. 33.

FIG. 32 shows an example of a display of the display screen 31 displaying a portion of listings indicating a question and an answer, a degree of difficulty, a degree of importance, and damage points (displayed as HP) for each card, which are memorized as a database in the memory means 42 (i.e., an example of a display at the time when a card selection is required upon the COMBO offense). Each card, i.e., question is provided with a title indicating the contents of the card separately. For example, as a user clicks one card, items of formality except a question and an answer, etc. out of display items of the selected card are displayed as shown in FIG. 33. By clicking in the state of FIG. 33, details including questions of reference card numbers and COMBO No., etc. are displayed. By ticking a box for card selection from the states of FIG. 33 and FIG. 34, reference cards displaying reference questions as indicated in FIG. 9 for example may be displayed as a tree chart. The offense may select plural cards for a COMBO offense by seeing the tree chart (the cards can be selected by placing a pointer on the card to be selected and clicking the card).

FIGS. 35 to 38, inclusive, show an example of a technique appropriate for automatically making settings of reference relationship of cards (questions) and classifications of the cards (questions) with a computer. FIG. 35 shows the state of a card in which t neither card No. nor a COMBO No. as a reference number are provided, although a question and an answer have already been prepared. For each card (question), an important proper noun is registered out of proper nouns described in a question section or an answer section of the card. This registration may be finished by dragging the proper noun, turning it over, right-clicking a drop-down menu, and selecting "proper noun(s)" in a manner as shown in FIG. 36. For example, the selected proper nouns may be registered as proper nouns 1 to 5, inclusive.

Figure 37:
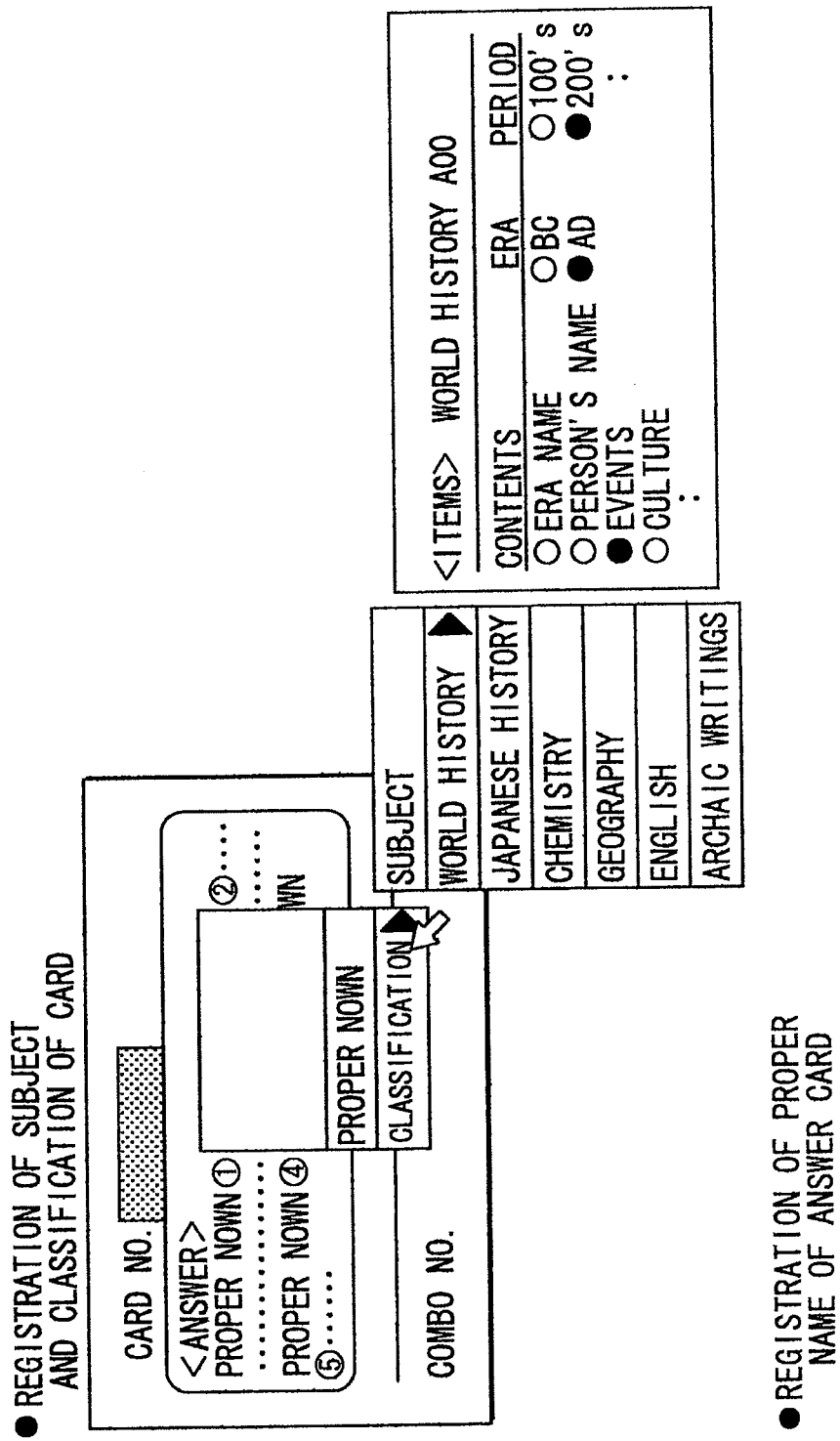
FIG. 37 is a view showing an example of registering a subject, classification, etc. of a card.

Before or after the registration of the proper noun, a subject and a classification of the card, etc. are registered as shown in FIG. 37. The registration of a classification may be done by pointing a pointer to the card No., right-clicking it to display a pulldown menu and selecting the classification. Then, a subject such as world history is selected to display a checklist corresponding to the subject. Ticking the checklist permits an automatic provision with a card number (a card number except the card number of a used card).

Figure 38:
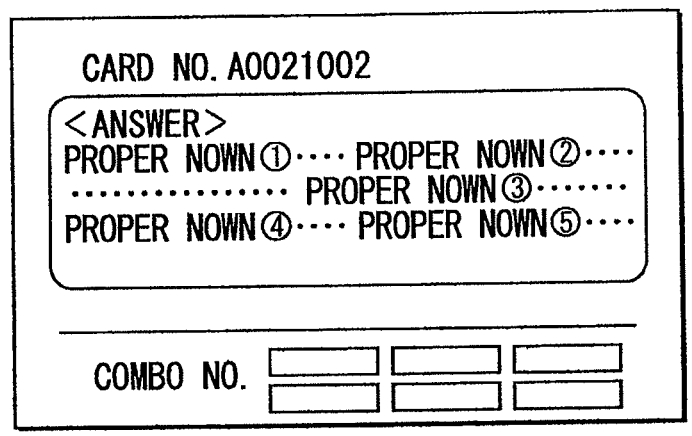
FIG. 38 is a view showing an example in which one card (question) is linked, etc. to a reference question.

Finally, for each card, a search is made for other cards containing the identical proper noun, and the card No. hit as having the identical proper noun by the search is registered as a COMBO No. acting as a reference card number. FIG. 38 shows an example of the card that is provided with the card No. and COMBO No.

Although the modes of examples have been described above, it is to be understood, however, that this invention is not limited to those modes of examples and any appropriate alterations and modifications encompassed within the claims are possible, for instance, which may include alterations and modifications as follows:

(1) In each case of the above examples, any one kind or two kinds of cards (questions) out of three kinds of cards (questions), i.e., 3A, 3B and 3C, may be used. Application cards may be classified entirely as one kind, i.e., application cards, without dividing them into quick answer style and full style. The cards to be put on the first area 11 (memory area) may not be restricted to memory cards, and application cards or all kinds of cards may be put on the memory area.

(2) In each case of the above examples, the victory and defeat of a match may be decided by the number of cards acquired, not by points. The number of the cards may also be counted as points. For instance, a player who acquired 100 cards first may be decided as a winner of the game.

(3) For each question, neither a degree of difficulty nor a degree of importance or only either one may be set. In another case, the degree of difficulty and/or importance may be displayed on the back of the card. In other words, neither the degree of difficulty nor the degree of importance may be seen or only either one may be seen at the time of presenting a card. It is preferred, however, that the displaying of the degree of difficulty and/or importance at the time of presenting the card may give a mental pressure onto an answerer, thereby encouraging to tackle questions seriously or heightening a game sense. Conversely, in the event that the degree of difficulty and/or importance is displayed only after the answer, this is preferred in the sense that the question can be answered by concentrating onto the question without bothering the degree of difficulty and/or importance.

(4) The game mats 10, 15 may be provided with the first area 11 and the second area 12 only without the third area 13. When this game mat is used, a question may be presented on an area other than the first area 11 and the second area 12.

(5) The game mat 10, 15 may be modified in such a fashion that the third area 13 is formed in an equilateral triangle with the second area 12 and the first area 11 connected to each side of the triangle (for three players). Likewise, the third area 13 may be formed in a regular pentagon (for five players) and in a regular hexagon (for six players). The game mat may be modified appropriately in accordance with the member of players.

(6) A game may be played without utilizing any game mat 10, 15. In this case, a COMBO offense may be permitted on the condition that, for instance, the player who has acquired the predetermined number of cards can make the COMBO offense (i.e., in the state that the first area 11 is filled with the predetermined number of the cards).

(7) A match game using a computer as shown in FIGS. 22 to 28, inclusive, may be played between plural user's terminals 21, 22 without intervention of the server 24 by exchanging information directly therebetween to proceed with the game. It is preferred, however, that at least a memory means 42 storing a large number of questions and answers is equipped within the server 24 and the memory means 42 is used by each of the user's terminals 21, 22, in order to save a burden of the user's terminals 21, 22 and to centralize questions in many and wide fields in one place to make them a database. In particular, it is preferred that, as the settings of questions and answers exert a great influence on learning results, the questions and answers thereto are prepared by specialists in the fields involved and users are permitted to use the questions and the answers thereto by pay or registration as members, etc., in order to secure a large number of high-quality questions and answers thereto. It is also preferred that the server 24 is equipped with a right-wrong judgment means (a step for judging right or wrong answers). This may also be preferred that the server 24 to have a function of judging a match at a neutral position.

(8) A match may be played by making a direct connection (wireless or wired) between the user's terminals 21 and 22 by cables or infrared rays, etc. without using a broadband network such as internet. In this case, as it is needed to permit at least one of the user's terminals 21 and 22 to memorize a program for performing operations for processing a large number of questions and answers thereto in the manner as shown in FIGS. 24 to 28, inclusive, players may purchase recording media such as CD-ROMs or DVD-ROMs memorizing a large number of questions and answers thereto and a program for performing operations and use them by installing the user's terminal 21, 22 with the recording media or as an external drive.

(9) A match may be played between a user and a computer (i.e., a virtual competitor), not between users. In this case, a virtual competitor may be divided by its learning level such as a junior class, a middle class and an advanced class, and the user can selected the learning level of the virtual competitor, thereby varying a rate of answer in accordance with a difference of the learning levels. In this case, it is also possible to permit the virtual competitor to automatically answer and/or perform various selections including a selection of a card from the holding cards.

(10) A game may be played by a single player. In this case, there is no longer a concept of an offense-and-defense match, and the game is played by the user presenting a question to the user' self and answering the question by the self. This game using a computer is preferred to learn plural reference questions in order to acquire a systematic knowledge and practice a match by oneself in order to win the game.

(11) The points may not be a negative one such as damage points and it may be set as a positive one. (In this case, contrary to such damage points, a player having a larger point value has an advantage or is decided as a winner).

(12) A game utilizing a computer as shown in FIGS. 22 to 28, inclusive, may be played without using the game mat 10, 15. In this case, questions and answers thereto may be displayed directly on the display screen 31.

(13) A game utilizing a computer as shown in FIGS. 22 to 28, inclusive, may be played in a system using no cards. In this case, questions and answers thereto may be displayed directly on the display screen 31. In the case of using no cards, reference questions may be presented by using a code No. (corresponding to a question No.), in place of the card No., which distinguishes each question from one another.

(14) The number of questions to be presented by a COMBO offense may be set always to the predetermined number, for example, three questions.

(15) The conditions for the COMBO offense may be set by a point value. More specifically, for instance, the point value may be divided into a first point value and a second point value and the first point value of a winner of one match may be set to be added and renewed until the first point value reaches a predetermined upper limit value and thereafter the point value acquired is added to the second point value and renewed until the second point value reaches a predetermined upper limit value. The match game may be set to be over as the second point value has reached the predetermined winning value. The COMBO offense may be set to be permitted only when the first point value reaches the predetermined upper limit value. (The state where the first area 11 filled with the predetermined number of cards corresponds to a state in which the first point value reaches the predetermined point value). The point value may also be set as only one kind and the COMBO offense may be permitted when the point value reaches the predetermined value.

(16) FIG. 32 shows an example of database and processes for forming database may be modified appropriately.

(17) For review of the questions which have been answered incorrectly after the end of the match game, they may be temporarily memorized for each player and a list of them may be displayed together with the right answers thereto. (This serves in heightening the learning results by review).

(18) As the offense is defeated by the COMBO offense, the number of cards to be deleted from the first area 11 of the offense may be set to two or more cards. The number of the cards may also be set to the same number of the cards as the number of cards presented upon the COMBO offense.

(19) For application questions for quick answer style (application cards for quick answer style) which display (or memorize) grounds for the answers, in addition to alternative answers by "O (YES)" or "X (NO)", for instance, the offense may select for each question whether to require such alternative answers or whether to require grounds for answers together with such alternative answers. Further, such conditions may be uniformly for all application questions in initial setting.

(20) A negative point may be given the offense if both of the offense and the defense gave wrong answers (as a penalty point to the offense presenting the question because the offense nevertheless gave a wrong answer). It may also be possible to provide the offense with a penalty point in initial setting.

(21) Upon the COMBO offense (by presenting the plural reference questions), points may be given in accordance with the number of questions that have been answered correctly (or incorrectly) by accepting right (or wrong) answers to a portion of the questions without requiring the right answers to all the questions. In this case, the offense may select each time upon presenting each question whether all questions are required to be answered correctly or whether the correct answers to a portion of all the questions are accepted or decide uniformly in initial setting which is to be selected.

(22) The points to be given in accordance with a question may be altered in accordance with learning levels of match players (learning levels of persons). For instance, when the points to be presented for each question are set as a basic point, a negative point (a damage point) may be given the defeated player in such a manner that the damage point set as the basic point is given intact the player of an advanced class, while the damage point corresponding to 70% of the basic point may be given the player of a beginner's class (by altering a rate of the points). By altering the point rate as described above, players having different learning levels may also enjoy a match. The setting of the point rate in accordance with a difference of learning levels may be performed in the initial setting.

(23) The application cards for quick answer style may be prepared so as to have only alternative answers by "O (YES)" or "X (O)" without grounds for the answers.

(24) Steps or groups of steps indicated in each flowchart may be represented as functional portions of a computer by providing the functions with names of means. For instance, as shown in FIGS. 24 to 28, inclusive, S23 of FIG. 26 may be represented as a means for presenting a question, S27 as a means for presenting an answer, and S27 as a means for judging a right or wrong answer. It is needless to state that the objects of this invention are not restricted to those expressed herein or they may impliedly contain those represented as substantially preferred or as merits.

The invention claimed is:

1. A learning apparatus utilizing a computer comprising a computer memory and a processor for playing a match alternately between persons operating one or more input devices as an offense which presents a question and as a defense to which the question is presented in such a manner that the offense inputs a question and the defense answers the question, followed by the offense inputting an answer to the same question, and, when either one of the answers is right and the other answer is wrong, a winner of the match who gave the right answer is presented with a positive point or a loser of the match who gave the wrong answer is presented with a negative point; wherein the learning apparatus comprises:
   the computer memory storing a large number of questions and answers thereto and points as well as a reference question which is another question referenced by each question or an answer thereto and mapped thereto as a database; and
   the processor configured to:
      display on a display screen configured to display-plural cards in a first area of the display screen for each of the offense and the defense without overlapping with one another and display-plural cards without overlapping-one another in a second area on the display screen adjacent to the first area;
      present on the display screen a first question with the surface of a card up on the display screen by selecting it from a large number of questions of the database utilizing the input device;
      present a plurality of reference questions with the surface of each card up on the display screen, which are selected from a large number of questions of the database by the input device and which are referenced by each other and mapped thereto;
      select the answer to the first question by checking it with the database when the answer to the first question displayed on the display screen is inputted by the input device and display the answer thereto with the back of the one card up on the display screen;
      select the answers to the plurality of reference questions by checking them with the database when the answers to the plurality of reference questions displayed on the display screen are inputted by the input device and display the answers thereto with the back of each card up on the display screen, respectively;
      select a point set-by checking with the database on the basis of a selected answer to the first question and present the point selected for the first question, when the first question is presented, -or present points selected for each of the plurality of reference questions on the basis of selected answers to the plurality of reference questions, when the plurality of reference questions are presented; and
      display the card used for presenting the first question in the first area of the offense decided as the winner of the match on the basis of the answer to the first question or display the card on the second area of the offense if the first area of the offense is filled with a predetermined number of cards,
   wherein the plurality of reference questions are presented on the condition that a card is present on the second area of the offense and a larger number of the plurality of reference questions can be presented as the number of cards displayed on the second area of the offense increases.

2. The learning apparatus of claim 1, wherein the processor is further configured to present an option to present the plurality of reference questions-on the condition that the card is present on the second area.

3. The learning apparatus of claim 1 or 2, wherein the number of the cards displayed on the first area of the offense is decreased when the offense gives the wrong answers to the plurality of reference questions and the defense gives right answers thereto when the plurality of reference questions are presented.

4. The learning apparatus of claim 1, wherein:
   a decision of victory and defeat of the match is made when a total value of the points presented reaches a predetermined point value; and
   the winner of the match has an option to increase its own points or to decrease the points of the loser of the match on the basis of the decision of the match when the plural reference questions are presented.

5. The learning apparatus of claim 1, wherein:
   the computer memory stores each question mapped to at least one of a degree of difficulty and a degree of importance; and
   the point values-vary with at least one of the degree of difficulty and the degree of importance.

6. The learning apparatus of claim 1, wherein the learning apparatus includes a plurality of user terminals each equipped with a display screen that are mutually connected to a server through a network;
   the match is played between players operating different user terminals; and
   the server comprises the computer memory.

7. The learning apparatus of claim 1, wherein the computer memory further stores the reference question that is another question referenced by each question or the answer thereto and mapped thereto; and wherein the processor is configured to:
register an important term contained in the question and the answer thereto for each question;
search another question and the answer thereto containing the important term registered; and
store the questions searched as reference questions in the computer memory.

8. A non-transitory storage medium comprising a program for a learning apparatus computer comprising a memory and a processor, the program executing a method for playing a match game between players operating an input device alternately as an offense who presents a question on a display screen and a defense to whom the question is presented thereon in such a manner that the defense answers the question presented by the offense and thereafter the offense answers thereto and the answers presented by the offense and the defense are judged whether they are right or wrong, respectively, and that the player having given the right answer is judged as a winner of the match and is presented with a positive point or the player having given the wrong answer is judged as a loser of the match and is presented with a negative point; the method of playing the match game comprising:

displaying a first area for displaying plural cards of each of the offense and the defense without overlapping with one another and a second area, adjacent to the first area, for displaying plural cards of each of the offense and the defense without overlapping with one another;

displaying one first question selected with the surface of one card up on the display screen by selecting the one first question by the input device from contents of the memory storing a large number of questions and answers thereto and points as well as reference questions which are other questions referenced by each other and mapped thereto as a database for each question;

displaying plural reference questions referenced by each other with the surface of each of the cards up on the display screen by selecting the plural reference questions from contents of the memory by the input device:

selecting the answer to the first question by checking the answer with the database when the answer to the first question displayed on the display screen is inputted by the input device and for displaying the back of the one card indicating the answer thereto on the display screen by turning the card over;

selecting the answers to the plural reference questions displayed on the display screen by checking them with the database when the answers to the plural reference questions have been inputted by the input device, respectively, and for displaying the plural cards with the back of each card indicating the respective answer thereto up on the display screen by turning the cards over, respectively;

presenting a point value for the first question, which is selected by checking the point with the database on the basis of the selected first question answer and, in the case of presenting the plural reference questions, for presenting points decided on the basis of the points selected for each of the plural reference questions, respectively; and displaying the card indicating the first question presented on the first area of the offense as the winner of the match decided on the basis of the selected answer to the first question or on the second area of the offense when the first area of the offense is filled with the predetermined number of cards;

wherein the plural reference questions are displayed on the condition that a card is displayed on the second area of the offense and an increase the number of reference questions to be presented occurs as the number of cards displayed on the second area of the offense increases.

9. The non-transitory storage medium of claim 8, wherein the method of playing the match game further comprises selecting an option to display the plural reference questions when the card is displayed on the second area.

* * * * *